US012705840B2

(12) United States Patent
Dudovitch et al.

(10) Patent No.: US 12,705,840 B2
(45) **Date of Patent: *Aug. 11, 2026**

(54) APPLYING PREGENERATED VIRTUAL EXPERIENCES IN NEW LOCATION

(71) Applicant: Snap Inc., Santa Monica, CA (US)

(72) Inventors: Gal Dudovitch, Tel Aviv (IL); Peleg Harel, Ramat Gan (IL); Ma'ayan Mishin Shuvi, Givatayim (IL); Itamar Berger, Hod Hasharon (IL); Avihay Assouline, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 18/664,996

(22) Filed: May 15, 2024

(65) Prior Publication Data

US 2024/0296640 A1 Sep. 5, 2024

Related U.S. Application Data

(63) Continuation of application No. 17/848,087, filed on Jun. 23, 2022, now Pat. No. 12,020,386.

(51) Int. Cl.

*G06T 19/00* (2011.01)
*G06N 3/02* (2006.01)
*G06T 19/20* (2011.01)

(52) U.S. Cl.

CPC ............ *G06T 19/006* (2013.01); *G06N 3/02* (2013.01); *G06T 19/20* (2013.01)

(58) Field of Classification Search

None

See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
CN 104156700 A 11/2014
(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Frank S Chen

(74) *Attorney, Agent, or Firm* — Schwegman Lundberg & Woessner, P.A.

(57) ABSTRACT

Aspects of the present disclosure involve a system for providing virtual experiences. The system performs operations including selecting, by a messaging application, a virtual experience that represents a previously captured real-world environment at a first location; accessing an image representing a new real-world environment at a second location, the image depicting a plurality of real-world objects; receiving input that selects a first real-world object from the plurality of real-world objects depicted in the image; and modifying the image, accessed at the second location, based on the virtual experience to depict the previously captured real-world environment with the first real-world object.

20 Claims, 12 Drawing Sheets

(56) References Cited

U.S. PATENT DOCUMENTS 4,975,690 A 12/1990 Torres
5,072,412 A 12/1991 Henderson, Jr. et al.
5,493,692 A 2/1996 Theimer et al.
5,713,073 A 1/1998 Warsta
5,754,939 A 5/1998 Herz et al.
5,855,008 A 12/1998 Goldhaber et al.
5,880,731 A 3/1999 Liles et al.
5,883,639 A 3/1999 Walton et al.
5,999,932 A 12/1999 Paul
6,012,098 A 1/2000 Bayeh et al.
6,014,090 A 1/2000 Rosen et al.
6,023,270 A 2/2000 Brush, II et al.
6,029,141 A 2/2000 Bezos et al.
6,038,295 A 3/2000 Mattes
6,049,711 A 4/2000 Yehezkel et al.
6,154,764 A 11/2000 Nitta et al.
6,167,435 A 12/2000 Druckenmiller et al.
6,204,840 B1 3/2001 Petelycky et al.
6,205,432 B1 3/2001 Gabbard et al.
6,216,141 B1 4/2001 Straub et al.
6,223,165 B1 4/2001 Lauffer
6,285,381 B1 9/2001 Sawano et al.
6,285,987 B1 9/2001 Roth et al.
6,310,694 B1 10/2001 Okimoto et al.
6,317,789 B1 11/2001 Rakavy et al.
6,334,149 B1 12/2001 Davis, Jr. et al.
6,349,203 B1 2/2002 Asaoka et al.
6,353,170 B1 3/2002 Eyzaguirre et al.
6,446,004 B1 9/2002 Cao et al.
6,449,657 B2 9/2002 Stanbach et al.
6,456,852 B2 9/2002 Bar et al.
6,484,196 B1 11/2002 Maurille
6,487,601 B1 11/2002 Hubacher et al.
6,523,008 B1 2/2003 Avrunin
6,542,749 B2 4/2003 Tanaka et al.
6,549,768 B1 4/2003 Fraccaroli
6,618,593 B1 9/2003 Drutman et al.
6,622,174 B1 9/2003 Ukita et al.
6,631,463 B1 10/2003 Floyd et al.
6,636,247 B1 10/2003 Hamzy et al.
6,636,855 B2 10/2003 Holloway et al.
6,643,684 B1 11/2003 Malkin et al.
6,658,095 B1 12/2003 Yoakum et al.
6,665,531 B1 12/2003 Soderbacka et al.
6,668,173 B2 12/2003 Greene
6,684,238 B1 1/2004 Dutta
6,684,257 B1 1/2004 Camut et al.
6,698,020 B1 2/2004 Zigmond et al.
6,700,506 B1 3/2004 Winkler
6,720,860 B1 4/2004 Narayanaswami
6,724,403 B1 4/2004 Santoro et al.
6,757,713 B1 6/2004 Ogilvie et al.
6,772,195 B1 8/2004 Hatlelid et al.
6,832,222 B1 12/2004 Zimowski
6,834,195 B2 12/2004 Brandenberg et al.
6,836,792 B1 12/2004 Chen
6,842,779 B1 1/2005 Nishizawa
6,898,626 B2 5/2005 Ohashi
6,959,324 B1 10/2005 Kubik et al.
6,970,088 B2 11/2005 Kovach
6,970,907 B1 11/2005 Ullmann et al.
6,980,909 B2 12/2005 Root et al.
6,981,040 B1 12/2005 Konig et al.
7,020,494 B2 3/2006 Spriestersbach et al.
7,027,124 B2 4/2006 Foote et al.
7,072,963 B2 7/2006 Anderson et al.
7,085,571 B2 8/2006 Kalhan et al.
7,110,744 B2 9/2006 Freeny, Jr.
7,113,917 B2 9/2006 Jacobi et al.
7,124,164 B1 10/2006 Chemtob
7,149,893 B1 12/2006 Leonard et al.
7,173,651 B1 2/2007 Knowles
7,188,143 B2 3/2007 Szeto
7,203,380 B2 4/2007 Chiu et al.
7,206,568 B2 4/2007 Sudit
7,227,937 B1 6/2007 Yoakum et al.
7,237,002 B1 6/2007 Estrada et al.
7,240,089 B2 7/2007 Boudreau
7,269,426 B2 9/2007 Kokkonen et al.
7,280,658 B2 10/2007 Amini et al.
7,315,823 B2 1/2008 Brondrup
7,342,587 B2 3/2008 Danzig et al.
7,349,768 B2 3/2008 Bruce et al.
7,356,564 B2 4/2008 Hartselle et al.
7,391,900 B2 6/2008 Kim et al.
7,394,345 B1 7/2008 Ehlinger et al.
7,411,493 B2 8/2008 Smith
7,423,580 B2 9/2008 Markhovsky et al.
7,454,442 B2 11/2008 Cobleigh et al.
7,468,729 B1 12/2008 Levinson
7,508,419 B2 3/2009 Toyama et al.
7,519,670 B2 4/2009 Hagale et al.
7,535,890 B2 5/2009 Rojas
7,546,554 B2 6/2009 Chiu et al.
7,607,096 B2 10/2009 Oreizy et al.
7,636,755 B2 12/2009 Blattner et al.
7,639,251 B2 12/2009 Gu et al.
7,639,943 B1 12/2009 Kalajan
7,650,231 B2 1/2010 Gadler
7,668,537 B2 2/2010 DeVries
7,770,137 B2 8/2010 Forbes et al.
7,775,885 B2 8/2010 Van et al.
7,778,973 B2 8/2010 Choi
7,779,444 B2 8/2010 Glad
7,787,886 B2 8/2010 Markhovsky et al.
7,796,946 B2 9/2010 Eisenbach
7,801,954 B2 9/2010 Cadiz et al.
7,856,360 B2 12/2010 Kramer et al.
7,859,551 B2 12/2010 Bulman et al.
7,885,931 B2 2/2011 Seo et al.
7,925,703 B2 4/2011 Dinan et al.
8,001,204 B2 8/2011 Burtner et al.
8,032,586 B2 10/2011 Challenger et al.
8,082,255 B1 12/2011 Carlson, Jr. et al.
8,088,044 B2 1/2012 Tchao et al.
8,090,351 B2 1/2012 Klein
8,095,878 B2 1/2012 Bates et al.
8,098,904 B2 1/2012 Ioffe et al.
8,099,109 B2 1/2012 Altman et al.
8,108,774 B2 1/2012 Finn et al.
8,112,716 B2 2/2012 Kobayashi
8,117,281 B2 2/2012 Robinson et al.
8,130,219 B2 3/2012 Fleury et al.
8,131,597 B2 3/2012 Hudetz
8,135,166 B2 3/2012 Rhoads
8,136,028 B1 3/2012 Loeb et al.
8,145,998 B2 3/2012 Leahy et al.
8,146,001 B1 3/2012 Reese
8,146,005 B2 3/2012 Jones et al.
8,151,191 B2 4/2012 Nicol
8,161,115 B2 4/2012 Yamamoto
8,161,417 B1 4/2012 Lee
8,195,203 B1 6/2012 Tseng
8,199,747 B2 6/2012 Rojas et al.
8,208,943 B2 6/2012 Petersen
8,214,443 B2 7/2012 Hamburg
8,234,350 B1 7/2012 Gu et al.
8,276,092 B1 9/2012 Narayanan et al.
8,279,319 B2 10/2012 Date
8,280,406 B2 10/2012 Ziskind et al.
8,285,199 B2 10/2012 Hsu et al.
8,287,380 B2 10/2012 Nguyen et al.
8,301,159 B2 10/2012 Hamynen et al.
8,306,922 B1 11/2012 Kunal et al.
8,312,086 B2 11/2012 Velusamy et al.
8,312,097 B1 11/2012 Siegel et al.
8,326,315 B2 12/2012 Phillips et al.
8,326,327 B2 12/2012 Hymel et al.
8,332,475 B2 12/2012 Rosen et al.
8,352,546 B1 1/2013 Dollard
8,379,130 B2 2/2013 Forutanpour et al.
8,384,719 B2 2/2013 Reville et al.
8,385,950 B1 2/2013 Wagner et al.
RE44,054 E 3/2013 Kim

(56) References Cited

U.S. PATENT DOCUMENTS 8,396,708 B2 3/2013 Park et al.
8,402,097 B2 3/2013 Szeto
8,405,773 B2 3/2013 Hayashi et al.
8,418,067 B2 4/2013 Cheng et al.
8,423,409 B2 4/2013 Rao
8,425,322 B2 4/2013 Gillo et al.
8,458,601 B2 6/2013 Castelli et al.
8,462,198 B2 6/2013 Lin et al.
8,471,914 B2 6/2013 Sakiyama et al.
8,472,935 B1 6/2013 Fujisaki
8,484,158 B2 7/2013 Deluca et al.
8,495,503 B2 7/2013 Brown et al.
8,495,505 B2 7/2013 Smith et al.
8,504,926 B2 8/2013 Wolf
8,510,383 B2 8/2013 Hurley et al.
8,527,345 B2 9/2013 Rothschild et al.
8,554,627 B2 10/2013 Svendsen et al.
8,559,980 B2 10/2013 Pujol
8,560,612 B2 10/2013 Kilmer et al.
8,564,621 B2 10/2013 Branson et al.
8,564,710 B2 10/2013 Nonaka et al.
8,581,911 B2 11/2013 Becker et al.
8,594,680 B2 11/2013 Ledlie et al.
8,595,299 B1 11/2013 Wang et al.
8,597,121 B2 12/2013 del Valle
8,601,051 B2 12/2013 Wang
8,601,379 B2 12/2013 Marks et al.
8,613,089 B1 12/2013 Holloway et al.
8,632,408 B2 1/2014 Gillo et al.
8,648,865 B2 2/2014 Dawson et al.
8,659,548 B2 2/2014 Hildreth
8,660,358 B1 2/2014 Bergboer et al.
8,660,369 B2 2/2014 Llano et al.
8,660,793 B2 2/2014 Ngo et al.
8,682,350 B2 3/2014 Altman et al.
8,683,354 B2 3/2014 Khandelwal et al.
8,692,830 B2 4/2014 Nelson et al.
8,718,333 B2 5/2014 Wolf et al.
8,724,622 B2 5/2014 Rojas
8,732,168 B2 5/2014 Johnson
8,744,523 B2 6/2014 Fan et al.
8,745,132 B2 6/2014 Obradovich
8,761,800 B2 6/2014 Kuwahara
8,768,876 B2 7/2014 Shim et al.
8,775,972 B2 7/2014 Spiegel
8,788,680 B1 7/2014 Naik
8,790,187 B2 7/2014 Walker et al.
8,797,415 B2 8/2014 Arnold
8,798,646 B1 8/2014 Wang et al.
8,810,513 B2 8/2014 Ptucha et al.
8,812,171 B2 8/2014 Filev et al.
8,832,201 B2 9/2014 Wall
8,832,552 B2 9/2014 Arrasvuori et al.
8,839,327 B2 9/2014 Amento et al.
8,856,349 B2 10/2014 Jain et al.
8,874,677 B2 10/2014 Rosen et al.
8,886,227 B2 11/2014 Schmidt et al.
8,890,926 B2 11/2014 Tandon et al.
8,892,999 B2 11/2014 Nims et al.
8,909,679 B2 12/2014 Root et al.
8,909,725 B1 12/2014 Sehn
8,924,250 B2 12/2014 Bates et al.
8,963,926 B2 2/2015 Brown et al.
8,972,357 B2 3/2015 Shim et al.
8,989,786 B2 3/2015 Feghali
8,995,433 B2 3/2015 Rojas
9,015,285 B1 4/2015 Ebsen et al.
9,020,745 B2 4/2015 Johnston et al.
9,040,574 B2 5/2015 Wang et al.
9,055,416 B2 6/2015 Rosen et al.
9,086,776 B2 7/2015 Ye et al.
9,094,137 B1 7/2015 Sehn et al.
9,100,806 B2 8/2015 Rosen et al.
9,100,807 B2 8/2015 Rosen et al.
9,105,014 B2 8/2015 Collet et al.
9,113,301 B1 8/2015 Spiegel et al.
9,119,027 B2 8/2015 Sharon et al.
9,123,074 B2 9/2015 Jacobs et al.
9,143,382 B2 9/2015 Bhogal et al.
9,143,681 B1 9/2015 Ebsen et al.
9,152,477 B1 10/2015 Campbell et al.
9,159,166 B2 10/2015 Finn et al.
9,191,776 B2 11/2015 Root et al.
9,204,252 B2 12/2015 Root
9,225,897 B1 12/2015 Sehn et al.
9,241,184 B2 1/2016 Weerasinghe
9,256,860 B2 2/2016 Herger et al.
9,258,459 B2 2/2016 Hartley
9,298,257 B2 3/2016 Hwang et al.
9,314,692 B2 4/2016 Konoplev et al.
9,330,483 B2 5/2016 Du et al.
9,344,606 B2 5/2016 Hartley et al.
9,357,174 B2 5/2016 Li et al.
9,361,510 B2 6/2016 Yao et al.
9,378,576 B2 6/2016 Bouaziz et al.
9,385,983 B1 7/2016 Sehn
9,396,354 B1 7/2016 Murphy et al.
9,402,057 B2 7/2016 Kaytaz et al.
9,407,712 B1 8/2016 Sehn
9,407,816 B1 8/2016 Sehn
9,412,192 B2 8/2016 Mandel et al.
9,430,783 B1 8/2016 Sehn
9,439,041 B2 9/2016 Parvizi et al.
9,443,227 B2 9/2016 Evans et al.
9,450,907 B2 9/2016 Pridmore et al.
9,459,778 B2 10/2016 Hogeg et al.
9,460,541 B2 10/2016 Li et al.
9,489,661 B2 11/2016 Evans et al.
9,489,760 B2 11/2016 Li et al.
9,491,134 B2 11/2016 Rosen et al.
9,503,845 B2 11/2016 Vincent
9,508,197 B2 11/2016 Quinn et al.
9,532,171 B2 12/2016 Allen et al.
9,537,811 B2 1/2017 Allen et al.
9,544,257 B2 1/2017 Ogundokun et al.
9,576,400 B2 2/2017 Van Os et al.
9,589,357 B2 3/2017 Li et al.
9,592,449 B2 3/2017 Barbalet et al.
9,628,950 B1 4/2017 Noeth et al.
9,648,376 B2 5/2017 Chang et al.
9,697,635 B2 7/2017 Quinn et al.
9,706,040 B2 7/2017 Kadirvel et al.
9,710,821 B2 7/2017 Heath
9,744,466 B2 8/2017 Fujioka
9,746,990 B2 8/2017 Anderson et al.
9,749,270 B2 8/2017 Collet et al.
9,792,714 B2 10/2017 Li et al.
9,839,844 B2 12/2017 Dunstan et al.
9,854,219 B2 12/2017 Sehn
9,883,838 B2 2/2018 Kaleal, III et al.
9,898,849 B2 2/2018 Du et al.
9,911,073 B1 3/2018 Spiegel et al.
9,936,165 B2 4/2018 Li et al.
9,959,037 B2 5/2018 Chaudhri et al.
9,965,800 B1 5/2018 Pitstick et al.
9,980,100 B1 5/2018 Charlton et al.
9,990,373 B2 6/2018 Fortkort
10,039,988 B2 8/2018 Lobb et al.
10,097,492 B2 10/2018 Tsuda et al.
10,116,598 B2 10/2018 Tucker et al.
10,155,168 B2 12/2018 Blackstock et al.
10,242,477 B1 3/2019 Charlton et al.
10,242,503 B2 3/2019 McPhee et al.
10,262,250 B1 4/2019 Spiegel et al.
10,319,149 B1 6/2019 Cowburn et al.
10,362,219 B2 7/2019 Wilson et al.
10,475,225 B2 11/2019 Park et al.
10,504,266 B2 12/2019 Blattner et al.
10,573,048 B2 2/2020 Ni et al.
10,657,701 B2 5/2020 Osman et al.
10,672,096 B1 6/2020 Chen et al.
10,776,981 B1 9/2020 Gorbatyuk et al.
10,789,453 B2 9/2020 Savchenkov et al.
10,855,632 B2 12/2020 Kennedy

(56) References Cited

U.S. PATENT DOCUMENTS 10,984,569 B2 4/2021 Bondich et al.
11,049,310 B2 6/2021 Krokhalev et al.
11,151,794 B1 10/2021 Chepizhenko et al.
11,157,557 B2 10/2021 Mashrabov et al.
11,288,880 B2 3/2022 Shaburov et al.
11,308,677 B2 4/2022 Mashrabov et al.
2002/0047868 A1 4/2002 Miyazawa
2002/0067362 A1 6/2002 Agostino Nocera et al.
2002/0078456 A1 6/2002 Hudson et al.
2002/0087631 A1 7/2002 Sharma
2002/0097257 A1 7/2002 Miller et al.
2002/0122659 A1 9/2002 Mcgrath et al.
2002/0128047 A1 9/2002 Gates
2002/0144154 A1 10/2002 Tomkow
2002/0169644 A1 11/2002 Greene
2003/0001846 A1 1/2003 Davis et al.
2003/0016247 A1 1/2003 Lai et al.
2003/0017823 A1 1/2003 Mager et al.
2003/0020623 A1 1/2003 Cao et al.
2003/0023874 A1 1/2003 Prokupets et al.
2003/0037124 A1 2/2003 Yamaura et al.
2003/0052925 A1 3/2003 Daimon et al.
2003/0101230 A1 5/2003 Benschoter et al.
2003/0110503 A1 6/2003 Perkes
2003/0126215 A1 7/2003 Udell
2003/0148773 A1 8/2003 Spriestersbach et al.
2003/0164856 A1 9/2003 Prager et al.
2003/0229607 A1 12/2003 Zellweger et al.
2004/0027371 A1 2/2004 Jaeger
2004/0064429 A1 4/2004 Hirstius et al.
2004/0078367 A1 4/2004 Anderson et al.
2004/0111467 A1 6/2004 Willis
2004/0158739 A1 8/2004 Wakai et al.
2004/0189465 A1 9/2004 Capobianco et al.
2004/0203959 A1 10/2004 Coombes
2004/0215625 A1 10/2004 Svendsen et al.
2004/0243531 A1 12/2004 Dean
2004/0243688 A1 12/2004 Wugofski
2005/0021444 A1 1/2005 Bauer et al.
2005/0022211 A1 1/2005 Veselov et al.
2005/0048989 A1 3/2005 Jung
2005/0078804 A1 4/2005 Yomoda
2005/0097176 A1 5/2005 Schatz et al.
2005/0102381 A1 5/2005 Jiang et al.
2005/0104976 A1 5/2005 Currans
2005/0114783 A1 5/2005 Szeto
2005/0119936 A1 6/2005 Buchanan et al.
2005/0122405 A1 6/2005 Voss et al.
2005/0162419 A1 7/2005 Kim et al.
2005/0193340 A1 9/2005 Amburgey et al.
2005/0193345 A1 9/2005 Klassen et al.
2005/0198128 A1 9/2005 Anderson
2005/0206610 A1 9/2005 Cordelli
2005/0223066 A1 10/2005 Buchheit et al.
2005/0288954 A1 12/2005 McCarthy et al.
2006/0026067 A1 2/2006 Nicholas et al.
2006/0107297 A1 5/2006 Toyama et al.
2006/0114338 A1 6/2006 Rothschild
2006/0119882 A1 6/2006 Harris et al.
2006/0242239 A1 10/2006 Morishima et al.
2006/0252438 A1 11/2006 Ansamaa et al.
2006/0265417 A1 11/2006 Amato et al.
2006/0270419 A1 11/2006 Crowley et al.
2006/0287878 A1 12/2006 Wadhwa et al.
2006/0294465 A1 12/2006 Ronen et al.
2007/0004426 A1 1/2007 Pfleging et al.
2007/0038715 A1 2/2007 Collins et al.
2007/0040931 A1 2/2007 Nishizawa
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0113181 A1 5/2007 Blattner et al.
2007/0136228 A1 6/2007 Petersen
2007/0168863 A1 7/2007 Blattner et al.
2007/0176921 A1 8/2007 Iwasaki et al.
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0255456 A1 11/2007 Funayama
2007/0281690 A1 12/2007 Altman et al.
2008/0022329 A1 1/2008 Glad
2008/0025701 A1 1/2008 Ikeda
2008/0032703 A1 2/2008 Krumm et al.
2008/0033930 A1 2/2008 Warren
2008/0043041 A2 2/2008 Hedenstroem et al.
2008/0049704 A1 2/2008 Witteman et al.
2008/0062141 A1 3/2008 Chandhri
2008/0071559 A1 3/2008 Arrasvuori
2008/0076505 A1 3/2008 Ngyen et al.
2008/0092233 A1 4/2008 Tian et al.
2008/0094387 A1 4/2008 Chen
2008/0104503 A1 5/2008 Beall et al.
2008/0109844 A1 5/2008 Baldeschweiler et al.
2008/0120409 A1 5/2008 Sun et al.
2008/0147730 A1 6/2008 Lee et al.
2008/0148150 A1 6/2008 Mall
2008/0158222 A1 7/2008 Li et al.
2008/0158230 A1 7/2008 Sharma et al.
2008/0168033 A1 7/2008 Ott et al.
2008/0168489 A1 7/2008 Schraga
2008/0189177 A1 8/2008 Anderton et al.
2008/0207176 A1 8/2008 Brackbill et al.
2008/0208692 A1 8/2008 Garaventi et al.
2008/0214210 A1 9/2008 Rasanen et al.
2008/0222545 A1 9/2008 Lemay
2008/0255976 A1 10/2008 Altberg et al.
2008/0256446 A1 10/2008 Yamamoto
2008/0256577 A1 10/2008 Funaki et al.
2008/0266421 A1 10/2008 Takahata et al.
2008/0270938 A1 10/2008 Carlson
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0318616 A1 12/2008 Chipalkatti et al.
2009/0006191 A1 1/2009 Arankalle et al.
2009/0006565 A1 1/2009 Velusamy et al.
2009/0015703 A1 1/2009 Kim et al.
2009/0016617 A1 1/2009 Bregman-amitai et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0055484 A1 2/2009 Vuong et al.
2009/0058822 A1 3/2009 Chaudhri
2009/0070688 A1 3/2009 Gyorfi et al.
2009/0079846 A1 3/2009 Chou
2009/0089678 A1 4/2009 Sacco et al.
2009/0089710 A1 4/2009 Wood et al.
2009/0093261 A1 4/2009 Ziskind
2009/0099925 A1 4/2009 Mehta et al.
2009/0106672 A1 4/2009 Burstrom
2009/0132341 A1 5/2009 Klinger
2009/0132453 A1 5/2009 Hangartner et al.
2009/0132665 A1 5/2009 Thomsen et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0158170 A1 6/2009 Narayanan et al.
2009/0160970 A1 6/2009 Fredlund et al.
2009/0163182 A1 6/2009 Gatti et al.
2009/0177299 A1 7/2009 Van De Sluis

(56) References Cited

U.S. PATENT DOCUMENTS

2009/0177976 A1 7/2009 Bokor et al.
2009/0192900 A1 7/2009 Collision
2009/0199242 A1 8/2009 Johnson et al.
2009/0202114 A1 8/2009 Morin et al.
2009/0215469 A1 8/2009 Fisher et al.
2009/0232354 A1 9/2009 Camp, Jr. et al.
2009/0234815 A1 9/2009 Boerries et al.
2009/0239552 A1 9/2009 Churchill et al.
2009/0249222 A1 10/2009 Schmidt et al.
2009/0249244 A1 10/2009 Robinson et al.
2009/0265604 A1 10/2009 Howard et al.
2009/0265647 A1 10/2009 Martin et al.
2009/0288022 A1 11/2009 Almstrand et al.
2009/0291672 A1 11/2009 Treves et al.
2009/0292608 A1 11/2009 Polachek
2009/0300525 A1 12/2009 Jolliff et al.
2009/0303984 A1 12/2009 Clark et al.
2009/0319607 A1 12/2009 Belz et al.
2009/0327073 A1 12/2009 Li
2010/0011422 A1 1/2010 Mason et al.
2010/0023885 A1 1/2010 Reville et al.
2010/0062794 A1 3/2010 Han
2010/0082427 A1 4/2010 Burgener et al.
2010/0082693 A1 4/2010 Hugg et al.
2010/0100568 A1 4/2010 Papin et al.
2010/0113065 A1 5/2010 Narayan et al.
2010/0115426 A1 5/2010 Liu et al.
2010/0130233 A1 5/2010 Parker
2010/0131880 A1 5/2010 Lee et al.
2010/0131895 A1 5/2010 Wohlert
2010/0153144 A1 6/2010 Miller et al.
2010/0159944 A1 6/2010 Pascal et al.
2010/0161658 A1 6/2010 Hamynen et al.
2010/0161831 A1 6/2010 Haas et al.
2010/0162149 A1 6/2010 Sheleheda et al.
2010/0183280 A1 7/2010 Beauregard et al.
2010/0185552 A1 7/2010 Deluca et al.
2010/0185665 A1 7/2010 Horn et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0201482 A1 8/2010 Robertson et al.
2010/0201536 A1 8/2010 Robertson et al.
2010/0203968 A1 8/2010 Gill et al.
2010/0214436 A1 8/2010 Kim et al.
2010/0223128 A1 9/2010 Dukellis et al.
2010/0223343 A1 9/2010 Bosan et al.
2010/0227682 A1 9/2010 Reville et al.
2010/0250109 A1 9/2010 Johnston et al.
2010/0257196 A1 10/2010 Waters et al.
2010/0259386 A1 10/2010 Holley et al.
2010/0273509 A1 10/2010 Sweeney et al.
2010/0281045 A1 11/2010 Dean
2010/0306669 A1 12/2010 Della Pasqua
2011/0004071 A1 1/2011 Faiola et al.
2011/0010205 A1 1/2011 Richards
2011/0029512 A1 2/2011 Folgner et al.
2011/0040783 A1 2/2011 Uemichi et al.
2011/0040804 A1 2/2011 Peirce et al.
2011/0050909 A1 3/2011 Ellenby et al.
2011/0050915 A1 3/2011 Wang et al.
2011/0064388 A1 3/2011 Brown et al.
2011/0066743 A1 3/2011 Hurley et al.
2011/0083101 A1 4/2011 Sharon et al.
2011/0093780 A1 4/2011 Dunn
2011/0102630 A1 5/2011 Rukes
2011/0115798 A1 5/2011 Nayar et al.
2011/0119133 A1 5/2011 Igelman et al.
2011/0137881 A1 6/2011 Cheng et al.
2011/0145564 A1 6/2011 Moshir et al.
2011/0148864 A1 6/2011 Lee et al.
2011/0159890 A1 6/2011 Fortescue et al.
2011/0164163 A1 7/2011 Bilbrey et al.
2011/0197194 A1 8/2011 D'Angelo et al.
2011/0202598 A1 8/2011 Evans et al.
2011/0202968 A1 8/2011 Nurmi
2011/0211534 A1 9/2011 Schmidt et al.
2011/0213845 A1 9/2011 Logan et al.
2011/0215966 A1 9/2011 Kim et al.
2011/0225048 A1 9/2011 Nair
2011/0238763 A1 9/2011 Shin et al.
2011/0239136 A1 9/2011 Goldman et al.
2011/0255736 A1 10/2011 Thompson et al.
2011/0273575 A1 11/2011 Lee
2011/0282799 A1 11/2011 Huston
2011/0283188 A1 11/2011 Farrenkopf
2011/0314419 A1 12/2011 Dunn et al.
2011/0320373 A1 12/2011 Lee et al.
2012/0028659 A1 2/2012 Whitney et al.
2012/0033718 A1 2/2012 Kauffman et al.
2012/0036015 A1 2/2012 Sheikh
2012/0036443 A1 2/2012 Ohmori et al.
2012/0054797 A1 3/2012 Skog et al.
2012/0059722 A1 3/2012 Rao
2012/0062805 A1 3/2012 Candelore
2012/0084731 A1 4/2012 Filman et al.
2012/0084835 A1 4/2012 Thomas et al.
2012/0099800 A1 4/2012 Llano et al.
2012/0108293 A1 5/2012 Law et al.
2012/0110096 A1 5/2012 Smarr et al.
2012/0113106 A1 5/2012 Choi et al.
2012/0113143 A1 5/2012 Adhikari et al.
2012/0113272 A1 5/2012 Hata
2012/0123830 A1 5/2012 Svendsen et al.
2012/0123871 A1 5/2012 Svendsen et al.
2012/0123875 A1 5/2012 Svendsen et al.
2012/0124126 A1 5/2012 Alcazar et al.
2012/0124176 A1 5/2012 Curtis et al.
2012/0124458 A1 5/2012 Cruzada
2012/0130717 A1 5/2012 Xu et al.
2012/0131507 A1 5/2012 Sparandara et al.
2012/0131512 A1 5/2012 Takeuchi et al.
2012/0143760 A1 6/2012 Abulafia et al.
2012/0150978 A1 6/2012 Monaco
2012/0165100 A1 6/2012 Lalancette et al.
2012/0166971 A1 6/2012 Sachson et al.
2012/0169855 A1 7/2012 Oh
2012/0172062 A1 7/2012 Altman et al.
2012/0173991 A1 7/2012 Roberts et al.
2012/0176401 A1 7/2012 Hayward et al.
2012/0184248 A1 7/2012 Speede
2012/0197724 A1 8/2012 Kendall
2012/0200743 A1 8/2012 Blanchflower et al.
2012/0209924 A1 8/2012 Evans et al.
2012/0210244 A1 8/2012 De Francisco Lopez et al.
2012/0212632 A1 8/2012 Mate et al.
2012/0220264 A1 8/2012 Kawabata
2012/0226748 A1 9/2012 Bosworth et al.
2012/0233000 A1 9/2012 Fisher et al.
2012/0236162 A1 9/2012 Imamura
2012/0239761 A1 9/2012 Linner et al.
2012/0250951 A1 10/2012 Chen
2012/0252418 A1 10/2012 Kandekar et al.
2012/0254325 A1 10/2012 Majeti et al.
2012/0278387 A1 11/2012 Garcia et al.
2012/0278692 A1 11/2012 Shi
2012/0290637 A1 11/2012 Perantatos et al.
2012/0299954 A1 11/2012 Wada et al.
2012/0304052 A1 11/2012 Tanaka et al.
2012/0304080 A1 11/2012 Wormald et al.
2012/0307096 A1 12/2012 Ford et al.
2012/0307112 A1 12/2012 Kunishige et al.
2012/0319904 A1 12/2012 Lee et al.
2012/0323933 A1 12/2012 He et al.
2012/0324018 A1 12/2012 Metcalf et al.
2013/0006759 A1 1/2013 Srivastava et al.
2013/0024757 A1 1/2013 Doll et al.

(56) References Cited

U.S. PATENT DOCUMENTS

2013/0036364 A1 2/2013 Johnson
2013/0045753 A1 2/2013 Obermeyer et al.
2013/0050260 A1 2/2013 Reitan
2013/0055083 A1 2/2013 Fino
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0071093 A1 3/2013 Hanks et al.
2013/0080254 A1 3/2013 Thramann
2013/0085790 A1 4/2013 Palmer et al.
2013/0086072 A1 4/2013 Peng et al.
2013/0090171 A1 4/2013 Holton et al.
2013/0095857 A1 4/2013 Garcia et al.
2013/0103760 A1 4/2013 Golding et al.
2013/0104053 A1 4/2013 Thornton et al.
2013/0110885 A1 5/2013 Brundrett, III
2013/0111514 A1 5/2013 Slavin et al.
2013/0128059 A1 5/2013 Kristensson
2013/0129252 A1 5/2013 Lauper
2013/0132477 A1 5/2013 Bosworth et al.
2013/0145286 A1 6/2013 Feng et al.
2013/0159110 A1 6/2013 Rajaram et al.
2013/0159919 A1 6/2013 Leydon
2013/0169822 A1 7/2013 Zhu et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0201187 A1 8/2013 Tong et al.
2013/0218965 A1 8/2013 Abrol et al.
2013/0218968 A1 8/2013 Mcevilly et al.
2013/0222323 A1 8/2013 Mckenzie
2013/0227476 A1 8/2013 Frey
2013/0232194 A1 9/2013 Knapp et al.
2013/0249948 A1 9/2013 Reitan
2013/0257877 A1 10/2013 Davis
2013/0263031 A1 10/2013 Oshiro et al.
2013/0265450 A1 10/2013 Barnes, Jr.
2013/0267253 A1 10/2013 Case et al.
2013/0275505 A1 10/2013 Gauglitz et al.
2013/0275886 A1 10/2013 Haswell et al.
2013/0290443 A1 10/2013 Collins et al.
2013/0304646 A1 11/2013 De Geer
2013/0311255 A1 11/2013 Cummins et al.
2013/0325964 A1 12/2013 Berberat
2013/0344896 A1 12/2013 Kirmse et al.
2013/0346869 A1 12/2013 Asver et al.
2013/0346877 A1 12/2013 Borovoy et al.
2014/0006129 A1 1/2014 Heath
2014/0011538 A1 1/2014 Mulcahy et al.
2014/0019264 A1 1/2014 Wachman et al.
2014/0032682 A1 1/2014 Prado et al.
2014/0043204 A1 2/2014 Basnayake et al.
2014/0043329 A1 2/2014 Wang et al.
2014/0045530 A1 2/2014 Gordon et al.
2014/0047016 A1 2/2014 Rao
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1 2/2014 Gandhi
2014/0055554 A1 2/2014 Du et al.
2014/0057660 A1 2/2014 Wager
2014/0082651 A1 3/2014 Sharifi
2014/0092130 A1 4/2014 Anderson et al.
2014/0096029 A1 4/2014 Schultz
2014/0114565 A1 4/2014 Aziz et al.
2014/0122658 A1 5/2014 Haeger et al.
2014/0122787 A1 5/2014 Shalvi et al.
2014/0125678 A1 5/2014 Wang et al.
2014/0129343 A1 5/2014 Finster et al.
2014/0129953 A1 5/2014 Spiegel
2014/0143143 A1 5/2014 Fasoli et al.
2014/0149519 A1 5/2014 Redfern et al.
2014/0155102 A1 6/2014 Cooper et al.
2014/0173424 A1 6/2014 Hogeg et al.
2014/0173457 A1 6/2014 Wang et al.
2014/0189592 A1 7/2014 Benchenaa et al.
2014/0207679 A1 7/2014 Cho
2014/0214471 A1 7/2014 Schreiner, III
2014/0214629 A1 7/2014 Azam et al.
2014/0222564 A1 8/2014 Kranendonk et al.
2014/0258405 A1 9/2014 Perkin
2014/0265359 A1 9/2014 Cheng et al.
2014/0266703 A1 9/2014 Dalley, Jr. et al.
2014/0279061 A1 9/2014 Elimeliah et al.
2014/0279436 A1 9/2014 Dorsey et al.
2014/0279540 A1 9/2014 Jackson
2014/0280537 A1 9/2014 Pridmore et al.
2014/0282096 A1 9/2014 Rubinstein et al.
2014/0287779 A1 9/2014 O'keefe et al.
2014/0289833 A1 9/2014 Briceno
2014/0306986 A1 10/2014 Gottesman et al.
2014/0317302 A1 10/2014 Naik
2014/0317659 A1 10/2014 Yasutake
2014/0324627 A1 10/2014 Haver et al.
2014/0324629 A1 10/2014 Jacobs
2014/0325383 A1 10/2014 Brown et al.
2015/0020086 A1 1/2015 Chen et al.
2015/0046278 A1 2/2015 Pei et al.
2015/0071619 A1 3/2015 Brough
2015/0087263 A1 3/2015 Branscomb et al.
2015/0088622 A1 3/2015 Ganschow et al.
2015/0095020 A1 4/2015 Leydon
2015/0096042 A1 4/2015 Mizrachi
2015/0116529 A1 4/2015 Wu et al.
2015/0169827 A1 6/2015 Laborde
2015/0172534 A1 6/2015 Miyakawa et al.
2015/0178260 A1 6/2015 Brunson
2015/0193982 A1 7/2015 Mihelich et al.
2015/0206349 A1 7/2015 Rosenthal et al.
2015/0222814 A1 8/2015 Li et al.
2015/0261917 A1 9/2015 Smith
2015/0312184 A1 10/2015 Langholz et al.
2015/0350136 A1 12/2015 Flynn, III et al.
2015/0365795 A1 12/2015 Allen et al.
2015/0378502 A1 12/2015 Hu et al.
2016/0006927 A1 1/2016 Sehn
2016/0014063 A1 1/2016 Hogeg et al.
2016/0085773 A1 3/2016 Chang et al.
2016/0085863 A1 3/2016 Allen et al.
2016/0099901 A1 4/2016 Allen et al.
2016/0134840 A1 5/2016 Mcculloch
2016/0180887 A1 6/2016 Sehn
2016/0182422 A1 6/2016 Sehn et al.
2016/0182875 A1 6/2016 Sehn
2016/0234149 A1 8/2016 Tsuda et al.
2016/0239248 A1 8/2016 Sehn
2016/0277419 A1 9/2016 Allen et al.
2016/0321708 A1 11/2016 Sehn
2017/0006094 A1 1/2017 Abou Mahmoud et al.
2017/0061308 A1 3/2017 Chen et al.
2017/0080346 A1 3/2017 Abbas
2017/0087473 A1 3/2017 Siegel et al.
2017/0113140 A1 4/2017 Blackstock et al.
2017/0118145 A1 4/2017 Aittoniemi et al.
2017/0199855 A1 7/2017 Fishbeck
2017/0235848 A1 8/2017 Van Deusen et al.
2017/0287006 A1 10/2017 Azmoodeh et al.
2017/0310934 A1 10/2017 Du et al.
2017/0312634 A1 11/2017 Ledoux et al.
2018/0047200 A1 2/2018 O'hara et al.
2018/0113587 A1 4/2018 Allen et al.
2018/0115503 A1 4/2018 Baldwin et al.
2018/0315076 A1 11/2018 Andreou
2018/0315133 A1 11/2018 Brody et al.
2018/0315134 A1 11/2018 Amitay et al.
2018/0349703 A1 12/2018 Rathod
2019/0001223 A1 1/2019 Blackstock et al.
2019/0057616 A1 2/2019 Cohen et al.

(56) References Cited

U.S. PATENT DOCUMENTS

2019/0139307 A1 5/2019 Min
2019/0179405 A1 6/2019 Sun et al.
2019/0188920 A1 6/2019 Mcphee et al.
2019/0369722 A1 12/2019 Lehtiniemi et al.
2020/0013222 A1* 1/2020 Fergie .................. G06T 19/006
2020/0234690 A1 7/2020 Savchenkov et al.
2020/0236301 A1 7/2020 Shaburov et al.
2020/0294195 A1 9/2020 Wang et al.
2020/0334885 A1 10/2020 Jahangiri et al.
2020/0388064 A1 12/2020 Nemchinov et al.
2020/0410763 A1 12/2020 Hare et al.
2021/0037179 A1 2/2021 Luo et al.
2021/0097712 A1 4/2021 Samudrala et al.
2021/0166491 A1 6/2021 Green
2021/0240315 A1 8/2021 Alvi et al.
2021/0303855 A1 9/2021 Anvaripour et al.
2021/0304447 A1 9/2021 Voss et al.
2021/0306557 A1 9/2021 Voss et al.
2021/0368039 A1 11/2021 Voss et al.
2021/0375016 A1 12/2021 Voss et al.
2022/0044479 A1 2/2022 Hare et al.
2022/0101608 A1 3/2022 Hu et al.
2022/0147566 A1 5/2022 Voss et al.
2023/0377027 A1* 11/2023 Florenzano ........... G06T 19/006
2023/0410436 A1* 12/2023 Beauchamp ............ G06F 3/167
2023/0419616 A1 12/2023 Dudovitch et al.
2025/0272928 A1* 8/2025 Lee ........................... G06T 5/77

FOREIGN PATENT DOCUMENTS

CN 103390287 B 8/2018
CN 109863532 A 6/2019
CN 110168478 A 8/2019
CN 106778453 B 5/2020
CN 111386547 A 7/2020
EP 2051480 A1 4/2009
EP 2151797 A1 2/2010
EP 2184092 A2 5/2010
EP 3155560 B1 5/2020
GB 2399928 A 9/2004
JP 2001230801 A 8/2001
JP 5497931 B2 3/2014
KR 19990073076 A 10/1999
KR 20010078417 A 8/2001
KR 101445263 B1 9/2014
KR 20210119441 A 10/2021
WO WO-1996024213 A1 8/1996
WO WO-1999063453 A1 12/1999
WO WO-2000058882 A1 10/2000
WO WO-2001029642 A1 4/2001
WO WO-2001050703 A3 7/2001
WO WO-2003094072 A1 11/2003
WO WO-2004095308 A1 11/2004
WO WO-2006107182 A1 10/2006
WO WO-2006118755 A2 11/2006
WO WO-2007089020 A1 8/2007
WO WO-2007092668 A2 8/2007
WO WO-2007134402 A1 11/2007
WO WO-2009043020 A2 4/2009
WO WO-2011040821 A1 4/2011
WO WO-2011119407 A1 9/2011
WO WO-2012139276 A1 10/2012
WO WO-2013008238 A1 1/2013
WO WO-2013027893 A1 2/2013
WO WO-2013045753 A1 4/2013
WO WO-2013152454 A1 10/2013
WO WO-2013166588 A1 11/2013
WO WO-2014006129 A1 1/2014
WO WO-2014031899 A1 2/2014
WO WO-2014068573 A1 5/2014
WO WO-2014115136 A1 7/2014
WO WO-2014194262 A2 12/2014
WO WO-2014194439 A1 12/2014
WO WO-2015192026 A1 12/2015
WO WO-2016044424 A1 3/2016
WO WO-2016054562 A1 4/2016
WO WO-2016065131 A1 4/2016
WO WO-2016090605 A1 6/2016
WO WO-2016100318 A2 6/2016
WO WO-2016100318 A3 6/2016
WO WO-2016100342 A1 6/2016
WO WO-2016149594 A1 9/2016
WO WO-2016179166 A1 11/2016
WO WO-2017132689 A1 8/2017
WO WO-2018081013 A1 5/2018
WO WO-2018102562 A1 6/2018
WO WO-2018129531 A1 7/2018
WO WO-2019089613 A1 5/2019
WO WO-2020150690 A2 7/2020
WO WO-2020150693 A1 7/2020
WO WO-2021202043 A1 10/2021
WO WO-2022005838 A1 1/2022
WO WO-2023250003 A1 12/2023

OTHER PUBLICATIONS

"Adding photos to your listing", eBay, [Online] Retrieved from the Internet: <URL: http://pages.ebay.com/help/sell/pictures.html>, (accessed May 24, 17), 4 pgs.
"U.S. Appl. No. 17/848,087, Non Final Office Action mailed Oct. 19, 2023", 20 pgs.
"U.S. Appl. No. 17/848,087, Notice of Allowance mailed Feb. 16, 2024", 5 pgs.
"U.S. Appl. No. 17/848,087, Response filed Jan. 19, 2024 to Non Final Office Action mailed Oct. 19, 2023", 8 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2023/025847, International Search Report mailed Sep. 29, 2023", 3 pgs.
"International Application Serial No. PCT/US2023/025847, Written Opinion mailed Sep. 29, 2023", 4 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J 0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

(56) References Cited

OTHER PUBLICATIONS

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"International Application Serial No. PCT/US2023/025847, International Preliminary Report on Patentability mailed Jan. 2, 2025", 6 pgs.
"European Application Serial No. 23741870.2, Response to Communication pursuant to Rules 161 and 162 EPC filed Jul. 30, 2025", 13 pgs.

* cited by examiner

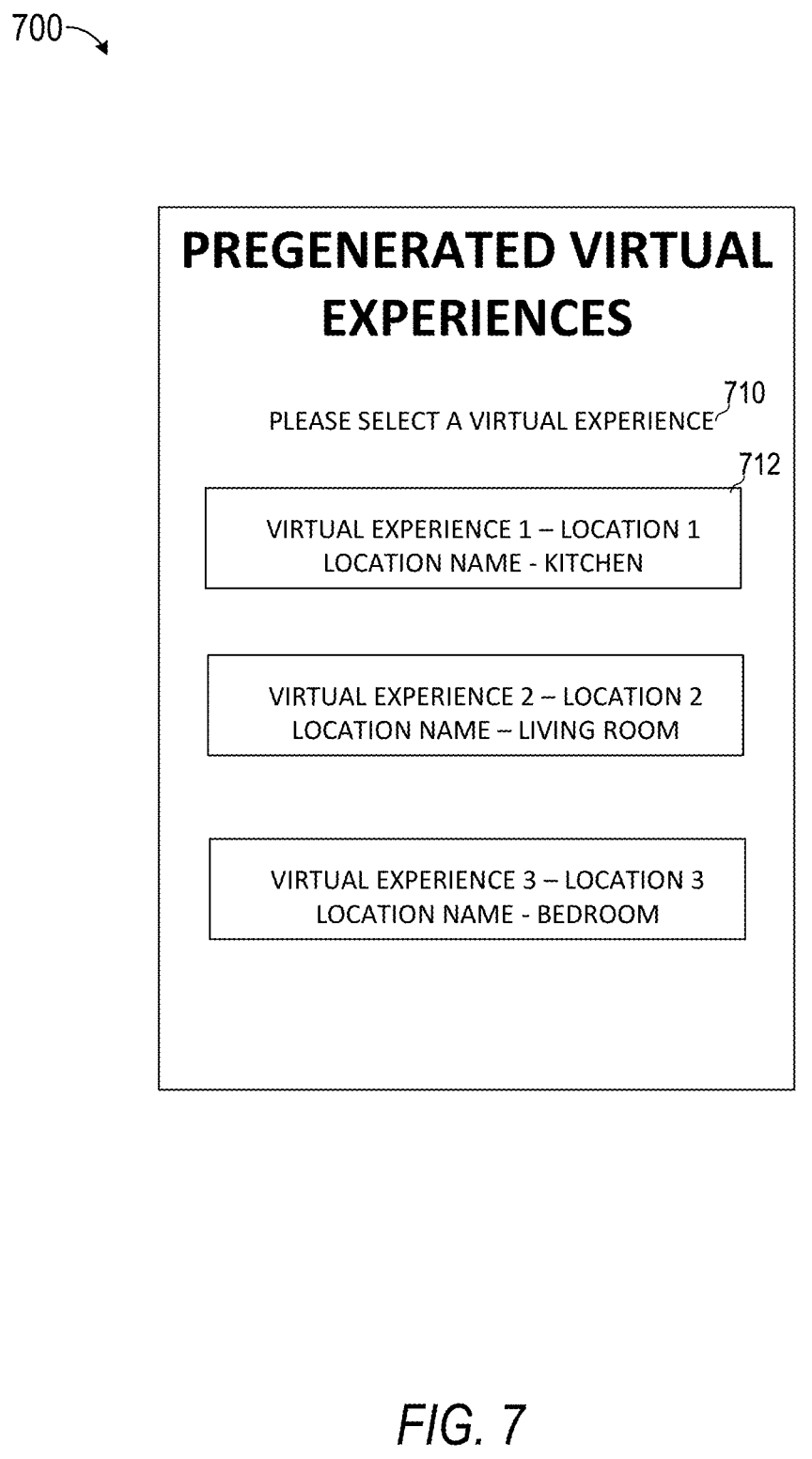

700

PREGENERATED VIRTUAL EXPERIENCES

PLEASE SELECT A VIRTUAL EXPERIENCE 710

712

VIRTUAL EXPERIENCE 1 – LOCATION 1
LOCATION NAME - KITCHEN

VIRTUAL EXPERIENCE 2 – LOCATION 2
LOCATION NAME – LIVING ROOM

VIRTUAL EXPERIENCE 3 – LOCATION 3
LOCATION NAME - BEDROOM

FIG. 7

APPLYING PREGENERATED VIRTUAL EXPERIENCES IN NEW LOCATION

CLAIM OF PRIORITY

This application is a continuation of U.S. patent application Ser. No. 17/848,087, filed on Jun. 23, 2022, the benefit of priority of which is claimed hereby, and which is incorporated by reference herein in its entirety.

TECHNICAL FIELD

The present disclosure relates generally to providing augmented reality experiences using a messaging application.

BACKGROUND

Augmented Reality (AR) is a modification of a virtual environment. For example, in Virtual Reality (VR), a user is completely immersed in a virtual world; whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 6-9 are diagrammatic representations of outputs of the pre-generated virtual experience system, in accordance with some examples.

DETAILED DESCRIPTION

Figure 1:
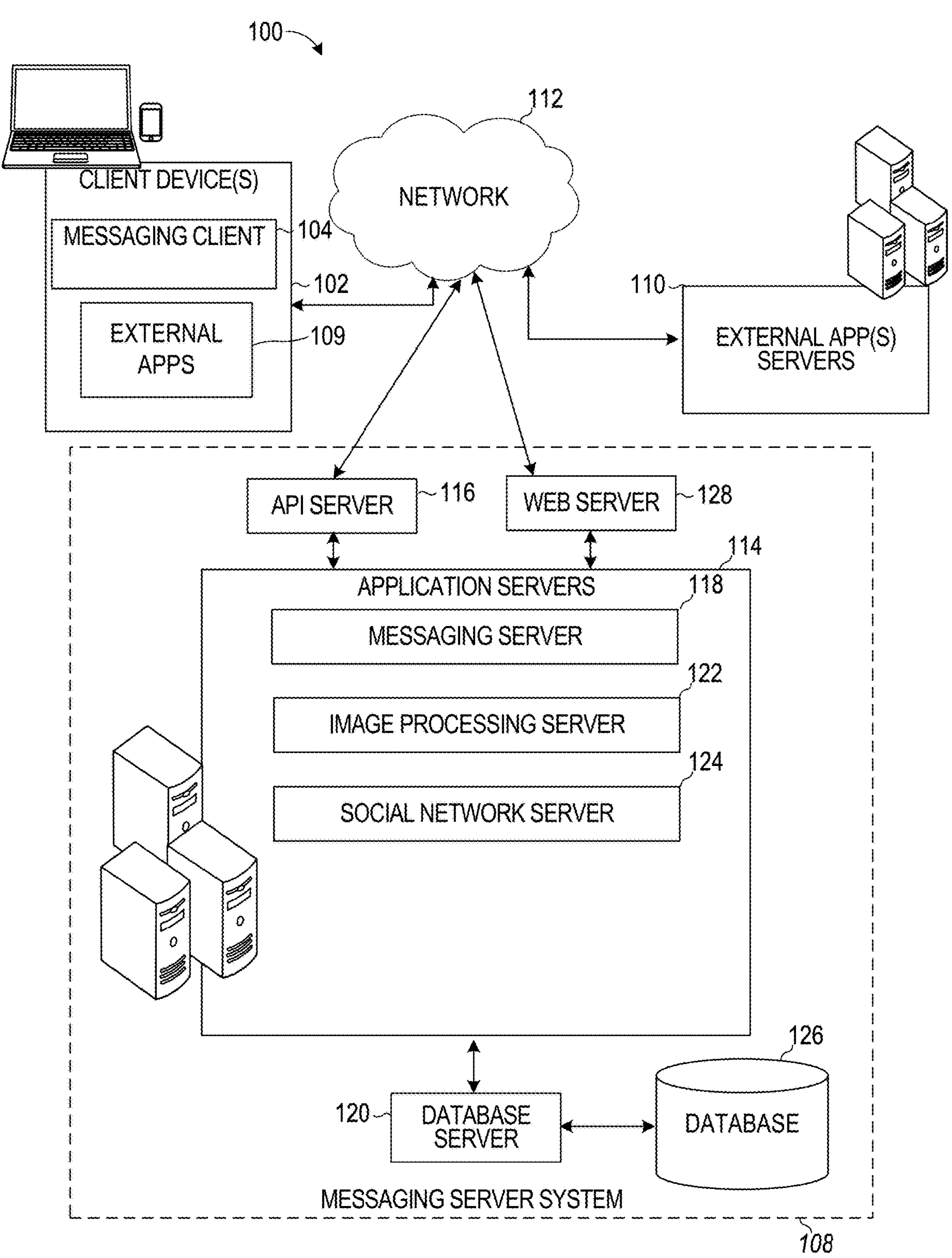
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems allow users to add AR elements to their environment (e.g., captured image data corresponding to a user's surroundings). Such systems can recommend AR elements based on various external factors, such as a current geographical location of the user and various other contextual clues. Some AR systems allow a user to capture a video of a room and select from a list of available AR elements to add to a room to see how the selected AR element looks in the room. These systems allow a user to preview how a physical item looks at a particular location in a user's environment, which simplifies the purchasing process. While these systems generally work well, they require a user to manually select which AR elements to display within the captured video and where to place the AR elements. Specifically, the user of these systems has to spend a great deal of effort searching through and navigating multiple user interfaces and pages of information to identify an item of interest. Then the user has to manually position the selected item within view. In many cases, the user is unaware of the dimensions of the AR elements, which results in the user placing the AR elements in unrealistic locations. These tasks can be daunting and time consuming, which detracts from the overall interest of using these systems and results in wasted resources.

Also, allowing the user to place the AR elements in unrealistic locations can result in the user believing a corresponding real-world product fits in the room and can lead the user to mistakenly purchasing the corresponding product. This ends up frustrating the user when the user ends up discovering that the corresponding real-world product does not fit in the room and reduces the level of trust the user has in the AR and VR systems.

In some cases, the user places an AR element in a particular location in the AR system. After placing the AR element, the user can move the camera to capture a video of another portion of the environment which does not include the positioned AR element. Namely, the AR element disappears from view when the camera is moved to capture a video of a location in the real-world environment in which the AR element was not placed. In this case, the user may not realize where the AR element was previously placed relative to the current location that is being displayed in the video. This can cause the user to become disoriented and confused and ends up frustrating the user.

The disclosed techniques improve the efficiency of using an electronic device which implements or otherwise accesses an AR/VR system by intelligently automatically generating a set of virtual environments that represent different real-world environments associated with a user. For example, the set of virtual environments can include a first virtual environment generated using a three-dimensional (3D) model of real-world objects present at a first location (e.g., a first room in a home) and a second virtual environment generated using a 3D model of real-world objects present at a second location (e.g., a second room in a home).

The disclosed techniques allow the user to enter a new physical location, such as a showroom in a store and to launch or access one of the previously generated virtual environments. The disclosed techniques receive input from the user that selects one or more real-world objects present at the new physical location in a video feed that is captured at the new physical location.

After the one or more real-world objects are selected, the previously generated virtual environment is launched and presented over the video feed that depicts objects at the new physical location. The disclosed techniques can overlay the previously generated virtual environment over all of the real-world objects that are depicted in the video feed except the one or more real-world objects that were selected by the received input. In this way, the video is modified to represent the three-dimensional (3D) model of real-world objects of the first location (or other selected location) in which the selected real-world objects of the new physical location are depicted. This allows the user to visualize how one or more real-world objects in a new physical location will look in a previously generated virtual environment of a different location (e.g., a room in the user's home). Using the disclosed techniques, the user can enter a store and see how physical objects in the store look like in the user's home which is represented by the selected virtual experience. The disclosed techniques enable the user to walk around the real-world object of the new physical location and update the views of the virtual environment so the user can see how the real-world object looks at different places in the user's home represented by the virtual environment.

Specifically, the disclosed techniques select, by a messaging application, a virtual experience that represents a previously captured real-world environment at a first location. The disclosed techniques access an image representing a new real-world environment at a second location, the image depicting a plurality of real-world objects. The disclosed techniques receive input that selects a first real-world object from the plurality of real-world objects depicted in the image. The disclosed techniques, in response to the input, modify the image, accessed at the second location, based on the virtual experience to depict the previously captured real-world environment with the first real-world object.

In this way, the disclosed techniques improve the overall experience of the user in using the electronic device and reduces the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108, and external app(s) servers 110 via a network 112 (e.g., the Internet). A messaging client 104 can also communicate with locally hosted third-party applications (also referred to as "external applications" and "external apps") 109 using Application Program Interfaces (APIs).

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 (sometimes referred to as a client application) is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108, but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections, the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or videos within the payload of a message sent from or received at the messaging server 118.

Figure 2:
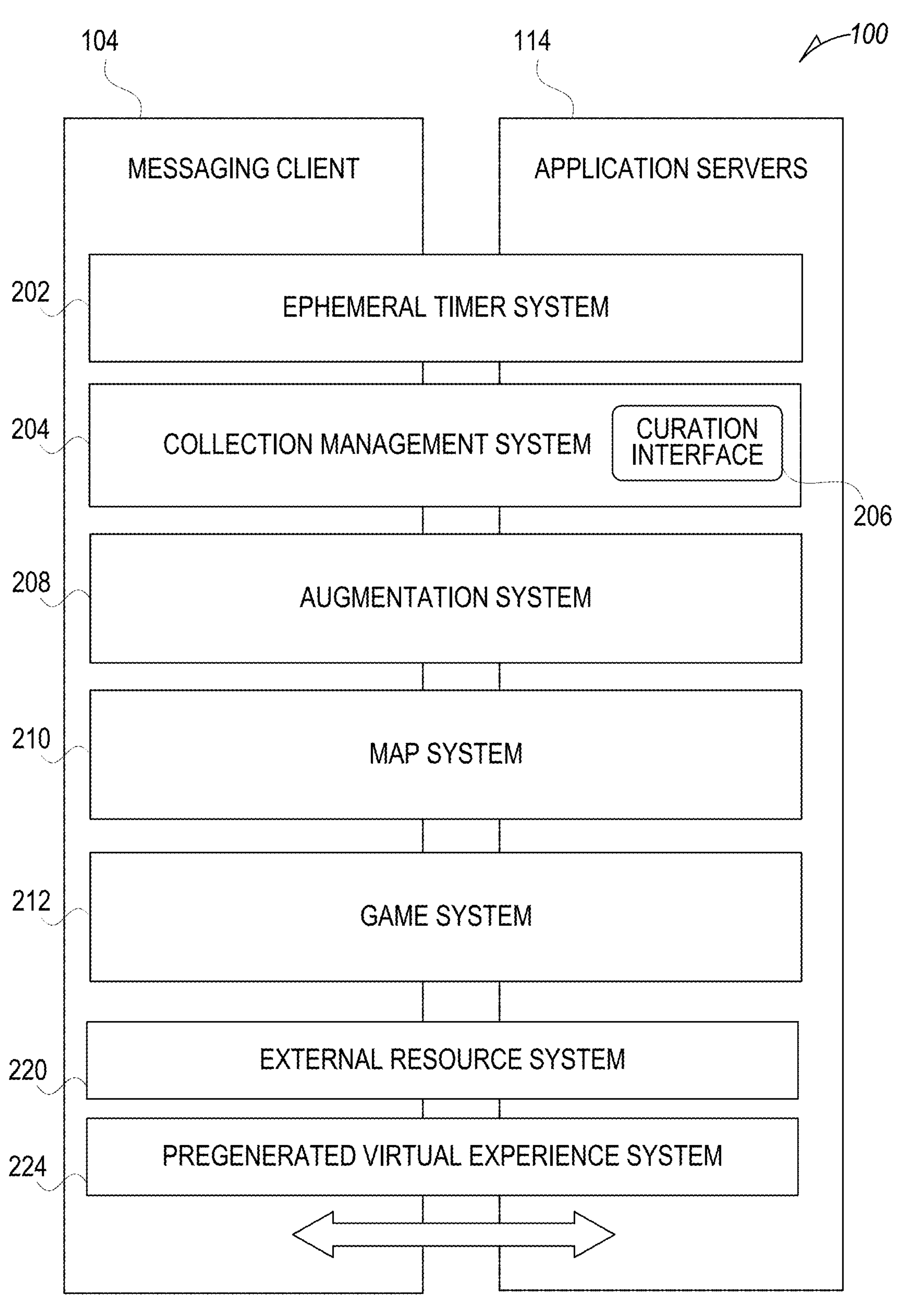
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., launching an AR experience, as discussed in connection with FIGS. 6-10 below).

Figure 3:
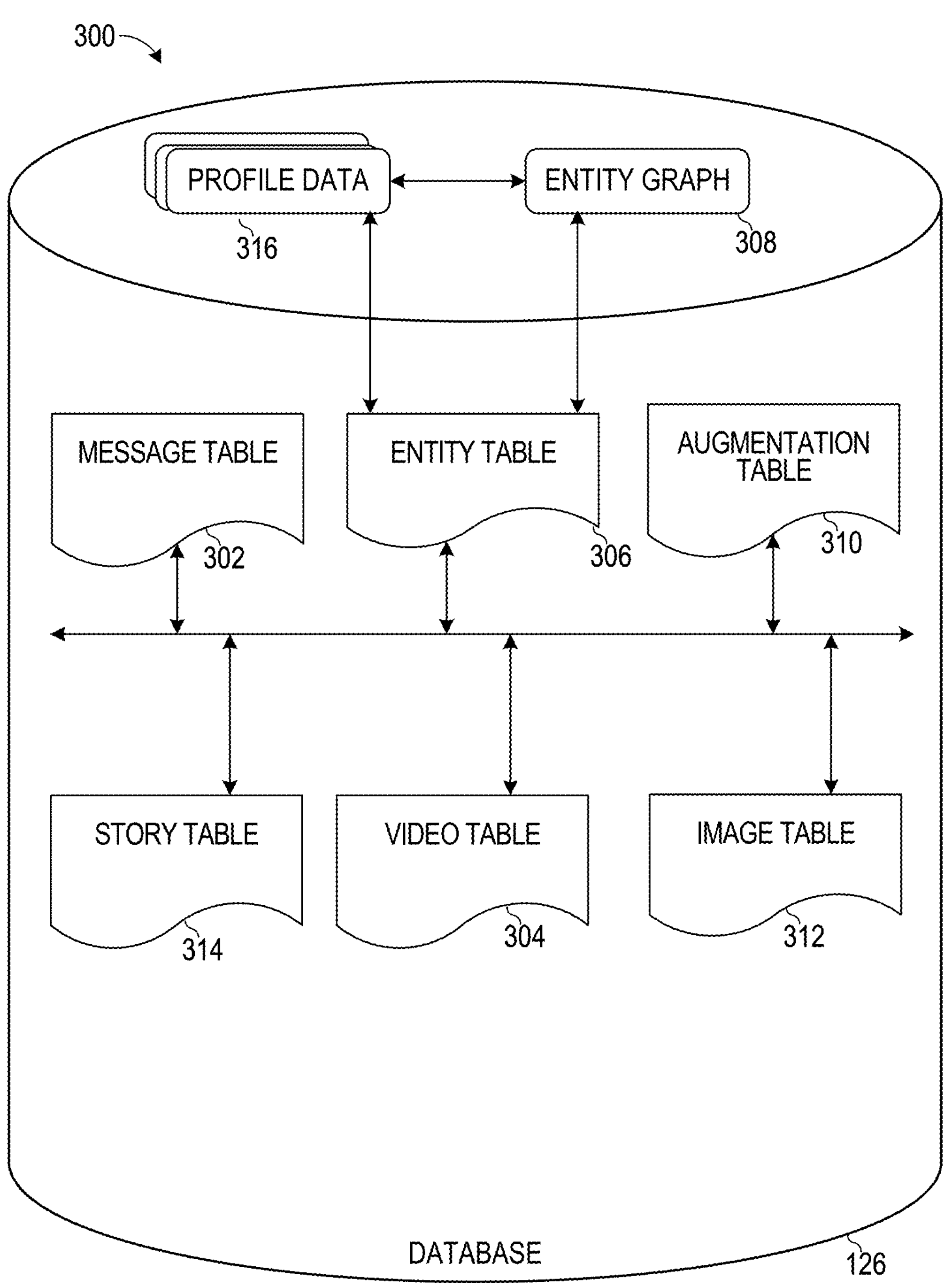
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally installed external application. In some cases, external applications 109 that are locally installed on the client device 102 can be launched independently of, and separately from, the messaging client 104, such as by selecting an icon, corresponding to the external application 109, or a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently used, but currently inactive (in the group of friends), external resource. The external resource can provide participants in a conversation, each using a respective messaging client, messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party, external applications 109, or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104, and on the sever side by the application servers 114. These subsystems include, for example, an ephemeral timer system 202, a collection management system 204, an augmentation system 208, a map system 210, a game system 212, an external resource system 220, and a pre-generated virtual experience system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102 of FIG. 1. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 of FIG. 1 and accessed through the database server 120 of FIG. 1.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112 of FIG. 1. The data exchanged can include a session identifier that identifies the shared AR session, a transformation between a first client device 102 and a second client device 102 (e.g., a plurality of client devices 102 includes the first and second devices) that is used to align the shared AR session to a common point of origin, a common coordinate frame, and functions (e.g., commands to invoke functions), as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and supports the provision of in-game rewards (e.g., coins and items).

The external resource system 220 provides an interface for the messaging client 104 to communicate with external app(s) servers 110 of FIG. 1 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118 of FIG. 1. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

The pre-generated virtual experience system 224 allows a user to generate a virtual experience (AR or VR) based on images captured of a first location that depict one or more real-world objects at the first location. For example, the pre-generated virtual experience system 224 can activate a camera and capture a set of images depicting a real-world environment at the first location, such as a room in a home. The pre-generated virtual experience system 224 processes the set of images to generate a 3D model of the real-world world environment at the first location. The 3D model can then be used to generate the virtual experience that can be launched at a second location to see how real-world objects at the second location look within the virtual experience corresponding to the first location. In some cases, as part of generating the 3D model, the pre-generated virtual experience system 224 collects or receives data collected from at least one of a lidar sensor or Neural radiance fields (NeRF) at the first location. The pre-generated virtual experience system 224 can apply a neural network to generate the 3D model.

In some examples, the pre-generated virtual experience system 224 can allow a user to edit the virtual experience such as re-arranging virtual objects depicted in the virtual experience, removing one or more virtual objects, adding one or more virtual objects, and/or modifying properties of the virtual objects. Specifically, the pre-generated virtual experience system 224 can receive input to launch a particular virtual experience that corresponds to a given location. The pre-generated virtual experience system 224 presents the virtual experience and receives input modifying one or more virtual objects depicted as part of the virtual experience.

In some examples, the pre-generated virtual experience system 224 can similarly generate additional virtual experiences corresponding to other locations, such as a third location to generate a second virtual experience. The pre-generated virtual experience system 224 stores a list of previously captured real-world environments that includes the first and second virtual experiences. The pre-generated virtual experience system 224 can display, by the messaging application, the list of previously captured real-world environments including the first and second virtual experiences on the client device 102.

For example, the pre-generated virtual experience system 224 selects, by a messaging application, a virtual experience that represents a previously captured real-world environment at a first location. In some examples, the pre-generated virtual experience system 224 receives input that selects the first virtual experience from the displayed list of previously captured real-world environments. The pre-generated virtual experience system 224 accesses an image representing a new real-world environment at a second location, the image depicting a plurality of real-world objects. The pre-generated virtual experience system 224 receives input that selects a first real-world object from the plurality of real-world objects depicted in the image. In some cases, the pre-generated virtual experience system 224 automatically selects the first real-world object based on attributes of the first real-world object. The pre-generated virtual experience system 224 modifies the image, accessed at the second location, based on the virtual experience to depict the previously captured real-world environment with the first real-world object.

In some examples, the virtual experience includes an AR experience. In such cases, the pre-generated virtual experience system 224 identifies a subset of the real-world objects depicted in the image that excludes the selected first real-world object. The pre-generated virtual experience system 224 overlays the AR experience on top of the subset of the real-world objects that exclude the selected first real-world object. The pre-generated virtual experience system 224 can remove the subset of the real-world objects from the image to keep only the first real-world object in the image, such as by deleting pixels corresponding to any object that is not the first real-world object. While the present disclosure discusses maintaining a single real-world object from a plurality of real-world objects in the view of the virtual experience, any number of real-world objects can be maintained. For example, a subset of real-world objects can collectively represent a living room set which includes multiple real-world objects. In such cases, all of the objects that are not part of the living room set are deleted or overlaid by the virtual experience and the living room set remains depicted in the captured image or video.

In some examples, the pre-generated virtual experience system 224 captures the image as part of a real-time feed received from a camera of client device and detecting movement of the camera of the client device 102. In response, the pre-generated virtual experience system 224 adjusts a relative position of the first real-world object within a view of the previously captured real-world environment depicted in the modified image as the movement of the camera is detected. Specifically, the pre-generated virtual experience system 224 adjusts the relative position by rotating the view of the previously captured real-world environment while the first real-world object remains stationary.

In some examples, the pre-generated virtual experience system 224 generates the virtual experience as a virtual reality experience. In such cases, the pre-generated virtual experience system 224 generates a virtual representation of the first real-world object and adds the virtual representation of the first real-world object to the VR experience.

In some examples, the pre-generated virtual experience system 224 generates the virtual experience and/or launches the virtual experience using estimated segmentations of one or more objects depicted in images captured at specific locations. The pre-generated virtual experience system 224 can train a neural network to segment real-world items to generate the virtual experience and/or to remove and/or keep specific real-world objects depicted in an image of a real-world environment of a particular location. The pre-generated virtual experience system 224 trains the neural network by performing operations including receiving training data comprising a plurality of training images and ground truth real-world item segmentations for each of the plurality of training images, each of the plurality of training images depicting a different type of real-world environment. The operations include applying the neural network to a first training image of the plurality of training images to estimate segmentations of items depicted in the first training image and computing a deviation between the estimated segmentations and the ground truth real-segmentations associated with the first training image. The neural network parameters are then updated based on the computed deviation and additional training data is processed to continue updating the parameters until the deviation satisfies a criterion.

In some examples, the pre-generated virtual experience system 224 presents the modified image on a first client device 102 of a first user, the virtual experience. The pre-generated virtual experience system 224 detects a second user within a threshold proximity to the first user, the second user being a friend of the first user on the messaging application. The pre-generated virtual experience system 224 provides an option to a second client device 102 of the second user to join the first user in the virtual experience. The pre-generated virtual experience system 224 can receive input from the second client device 102 that modifies one or more virtual elements presented in the modified image and applies one or more further modifications to the image based on the input received from the second client device 102, such that both the first and second users can perceive the modifications made by either the first, or second, client device 102. In some examples, the input received from the second client device 102 includes virtually drawing on real-world or virtual walls depicted in the modified image.

The pre-generated virtual experience system 224 is a component that can be accessed by an AR/VR application implemented on the client device 102. The AR/VR application uses an RGB camera to capture an image of a room in a home. The AR/VR application applies various trained machine learning techniques on the captured image or video of the real-world environment to segment items of the real-world environment. The AR/VR application includes a depth sensor to generate depth data. For example, the AR/VR application can maintain a specific real-world object (e.g., a piece of furniture), such as an AR chair or sofa, depicted in the image or video that is captured by the client device 102 to a virtual experience (e.g., an AR experience) corresponding to a different real-world environment that was previously captured at a different location. In some implementations, the AR/VR application continuously captures images of the real-world environment in real time, or periodically, to continuously, or periodically, update the locations of the real-world object within a view of the virtual experience. This allows the user to move around in the real world and see how the real-world objects looks in different areas of the virtual experience in real time.

An illustrative implementation of the pre-generated virtual experience system 224 is shown and described in connection with FIG. 5 below.

Data Architecture

FIG. 3 is a schematic diagram illustrating data structures 300, which may be stored in the database 126 of the messaging server system 108 of FIG. 1, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 of FIG. 1 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). AR content item or AR item may be a real-time special effect and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model, to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element applications, and any other suitable image or video manipulations implemented by a convolutional neural network that has been configured to execute efficiently on the client device 102.

In some examples, a computer animation model to transform image data can be used by a system where a user may capture an image or video stream of the user (e.g., a selfie), using a client device 102, having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping, or selecting, the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to segment real-world objects or items of real-world environment depicted in an image corresponding to a location (e.g., a room in a home). The training data can include a plurality of images and videos and their corresponding ground-truth room segmentations. The images and videos can include a mix of all sorts of real-world objects that can appear in different rooms in a home or household. The one or more machine learning techniques can be trained to extract features of a received input image or video and establish a relationship between the extracted features and segmentations. Once trained, the machine learning technique can receive a new image or video and can compute a segmentation of items depicted in the newly received image or video.

Data Communications Architecture

Figure 4:
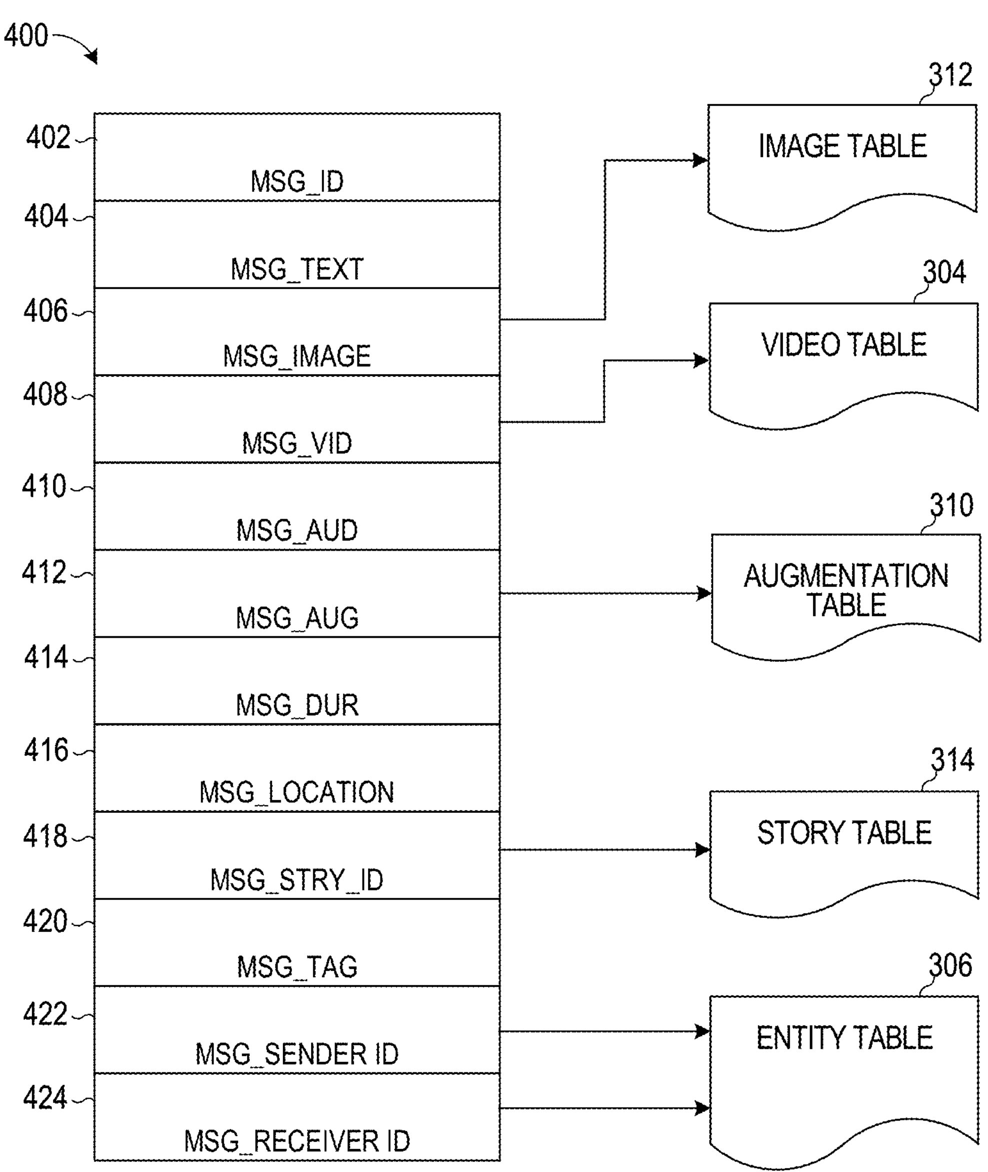
FIG. 4 is a diagrammatic representation of a message, in accordance with some examples.

FIG. 4 is a schematic diagram illustrating a structure of a message 400, according to some examples, generated by a messaging client 104 of FIG. 1 for communication to a further messaging client 104 or the messaging server 118 of FIG. 1. The content of a particular message 400 is used to populate the message table 302 stored within the database 126 of FIG. 1, accessible by the messaging server 118. Similarly, the content of a message 400 is stored in memory as "in-transit" or "in-flight" data of the client device 102 or the application servers 114 of FIG. 1. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102, or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Pre-Generated Virtual Experience System

Figure 5:
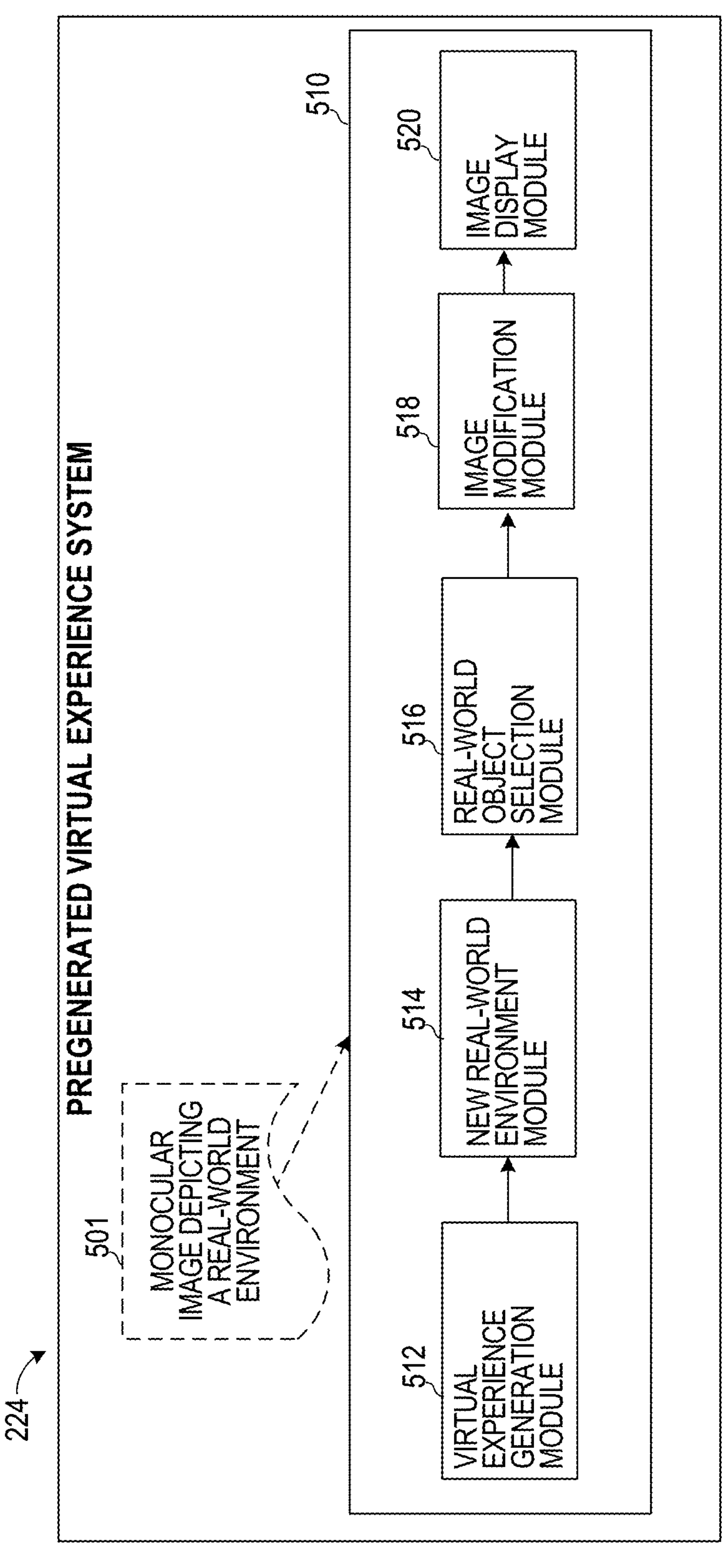
FIG. 5 is a block diagram showing an example pre-generated virtual experience system, according to some examples.

FIG. 5 is a block diagram showing an example pre-generated virtual experience system 224 of FIG. 2, according to examples. The pre-generated virtual experience system 224 includes a set of components 510 that operate on a set of input data (e.g., a monocular image (or video)) depicting a real-world environment 501. The pre-generated virtual experience system 224 includes a virtual experience generation module 512, a new real-world environment module 514, a real-world object selection module 516, an image modification module 518, and an image display module 520. All or some of the components of the pre-generated virtual experience system 224 can be implemented by a server, in which case, the monocular image depicting a real-world environment 501 is provided to the server by the client device 102. In some cases, some or all of the components of the pre-generated virtual experience system 224 can be implemented by the client device 102 of FIG. 1 or can be distributed across a set of client devices 102 and one or more servers.

Figure 6:
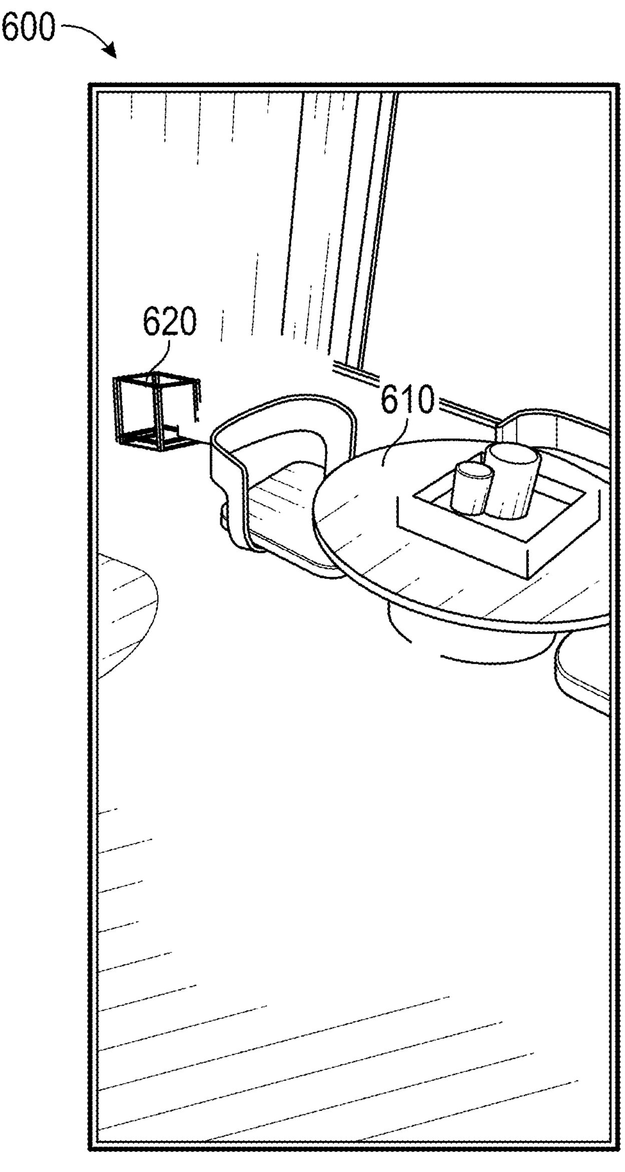

The virtual experience generation module 512 allows a user to generate one or more AR or VR experiences that represent or correspond to different real-world environments at different locations. For example, the virtual experience generation module 512 can receive input from a user that names a particular virtual experience, such as a living room, kitchen, bedroom, and so forth. Once the name is received, the virtual experience generation module 512 activates a camera to begin capturing images of the real-world environment at the first location. For example, as shown in FIG. 6, a user interface 600 is presented on the client device 102 in which a first real-world object 620 and a second real-world object 610 are depicted in one or more images.

The virtual experience generation module 512 can instruct the user to walk around the first location and turn to capture 360 degrees worth of images of the first real-world object 620 and the second real-world object 610. The virtual experience generation module 512 can instruct the user to focus the camera toward the ceiling and toward the ground. After a specified or sufficient quantity of images are captured representing multiple views of the real-world environment at the first location, the virtual experience generation module 512 stops capturing images and begins generating a 3D model of the real-world environment at the first location in which the first real-world object 620 and the second real-world object 610 are added as virtual objects of an AR/VR experience.

In some examples, together with capturing the images of the real-world environment (including the first real-world object 620 and the second real-world object 610) at the first location, the virtual experience generation module 512 can capture depth sensor information, such as LiDAR sensor data and/or NeRF information. The virtual experience generation module 512 can also implement an object detection module to segment one or more real-world objects (e.g., the first real-world object 620 and the second real-world object 610) depicted in the images of the real-world environment at the first location.

The object detection module can receive a monocular image (or video) depicting a real-world environment 501. This image or video can be received as part of a real-time video stream, a previously captured video stream, or a new image captured by a camera of the client device 102. The object detection module applies one or more machine learning techniques to identify real-world physical objects that appear in the monocular image depicting a real-world environment 501. For example, the object detection module can segment out individual objects in the image and assign a label, or name, to the individual objects. Specifically, the object detection module can recognize a sofa as an individual object, a television as another individual object, a light fixture as another individual object, and so forth. Any type of object that can appear or be present in a particular real-world environment (e.g., a room in a home or household) can be recognized and labeled by the object detection module.

Referring back to FIG. 5, during training, the machine learning technique of the object detection module receives a given training image (e.g., a monocular image or video depicting a real-world environment, such as an image of a living room or bedroom) from training image data stored in data structures 300 of FIG. 3. The machine learning technique (e.g., neural network or other machine learning model) is applied to the given training image. The machine learning technique extracts one or more features from the given training image to estimate item segmentations of real-world environment items depicted in the image or video. For example, the machine learning technique obtains the given training image, depicting a real-world environment, and extracts features from the image that correspond to the real-world objects that appear in the real-world environment.

The machine learning technique obtains a known, or predetermined, ground-truth segmentation of the real-world items depicted in the real-world environment from the training data. The machine learning technique compares (computes a deviation between) the estimated segmentations with the ground truth segmentations. Based on a difference threshold of the comparison (or deviation), the machine learning technique updates one or more coefficients or parameters and obtains one or more additional training images of a real-world environment. After a specified number of epochs, or batches, of training images have been processed and/or when a difference threshold, or deviation (computed as a function of a difference or deviation between the estimated segmentations and the ground-truth segmentations), reaches a specified value, the machine learning technique completes training and the parameters and coefficients of the machine learning technique are stored as a trained machine learning technique.

In an example, after training, the machine learning technique is implemented as part of the object detection module of the virtual experience generation module 512; and/or the new real-world environment module 514 receives a monocular input image, depicting a real-world environment 501 as a single RGB image from a client device 102, or as a video of multiple images. The machine learning technique applies the trained machine learning technique(s) to the received input image to extract one or more features, and to generate a prediction or estimation of segmentations of the real-world items or objects depicted in the monocular image.

The virtual experience generation module 512 collects information from the images, the object detection module, and/or the depth sensors to generate a 3D model of the real-world environment corresponding to the first location. The virtual experience generation module 512 uses the 3D model to generate a first AR or VR experience that corresponds to the first location. The first AR/VR experience enables the user to launch the AR/VR experience at a new location and see and interact with the real-world environment that corresponds to the first location (e.g., previous location). The virtual experience generation module 512 stores the first virtual experience as part of a list of previously captured virtual experiences.

In some examples, the virtual experience generation module 512 can receive input from a user that names a second virtual experience, such as a living room, kitchen, bedroom, and so forth. Once the name is received, the virtual experience generation module 512 activates a camera to begin capturing images of the real-world environment at a third location. The virtual experience generation module 512 can instruct the user to walk around the third location and turn to capture 360 degrees worth of images. The virtual experience generation module 512 can instruct the user to focus the camera toward the ceiling and toward the ground. After a specified, or sufficient, quantity of images are captured, representing multiple views of the real-world environment at the third location, the virtual experience generation module 512 stops capturing images and begins generating a 3D model of the real-world environment at the third location.

In some examples, together with capturing the images of the real-world environment at the third location, the virtual experience generation module 512 can capture depth sensor information, such as LiDAR sensor data and/or NeRF information. The virtual experience generation module 512 can also implement an object detection module to segment one or more real-world objects depicted in the images of the real-world environment at the third location.

The virtual experience generation module 512 collects information from the images, the object detection module, and/or the depth sensors to generate a 3D model of the real-world environment corresponding to the third location. The virtual experience generation module 512 uses the 3D model to generate a second AR or VR experience that corresponds to the third location. The third AR/VR experience enables the user to launch the AR/VR experience at a new location and see and interact with the real-world environment that corresponds to the third location (e.g., previous location). The virtual experience generation module 512 stores the second virtual experience as part of a list of previously captured virtual experiences that includes the first virtual experience.

The virtual experience generation module 512 can receive input to access or launch a given virtual experience. In response to receiving input that selects the first virtual experience 712, the virtual experience generation module 512 launches the virtual experience and allows the user to perform modifications to the virtual experience. For example, the user can add, remove, or change one or more virtual objects that are included as part of the given virtual experience.

The new real-world environment module 514 allows a user to enter a new real-world environment, such as a furniture store that includes one or more real-world objects (e.g., real-world furniture items). The new real-world environment module 514 can receive input from the user activating a camera and begins capturing one or more images or videos of the new real-world environment. As the images are captured, the new real-world environment module 514 can use the object detection module to estimate segmentations of the objects depicted in the images.

Figure 8:
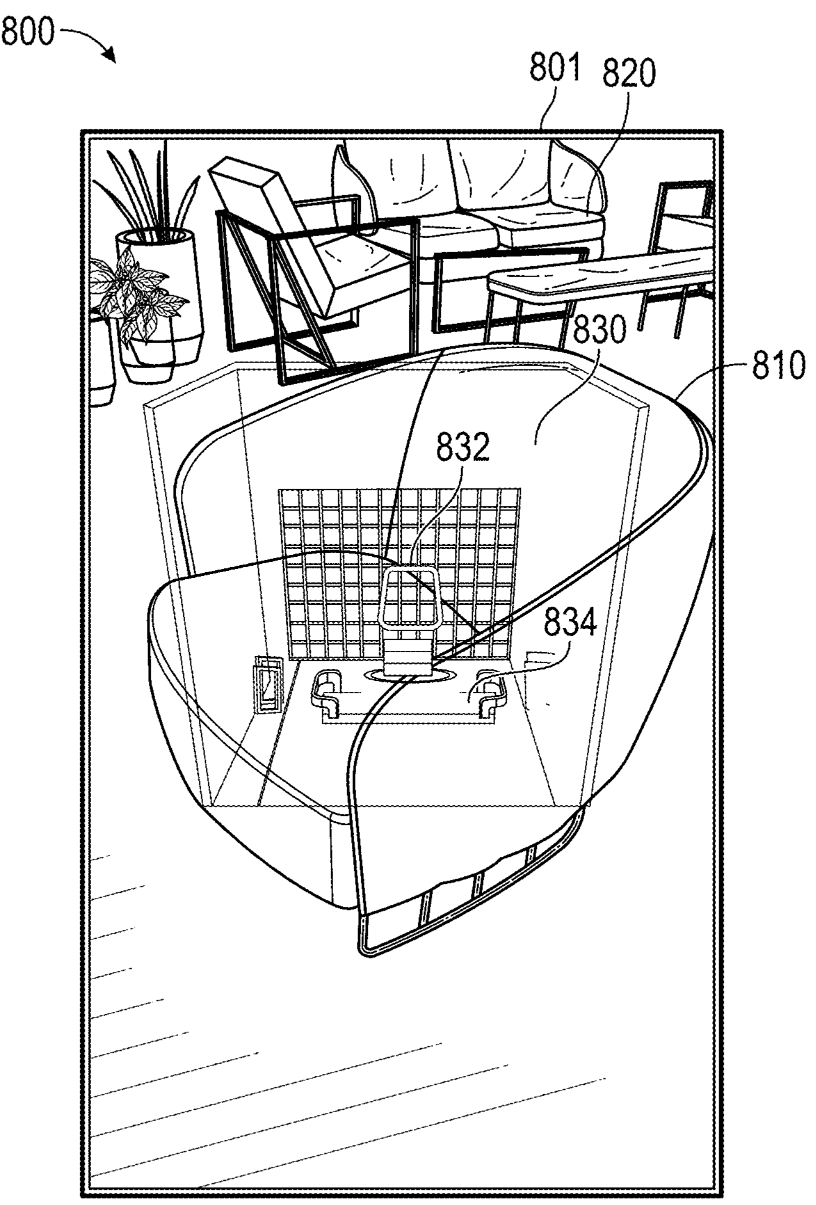

The real-world object selection module 516 can receive the images from the new real-world environment module 514 and present the images on a display of the client device 102. For example, as shown in FIG. 8, the real-world object selection module 516 can present a user interface 800 including an image 801 that depicts one or more real-world objects of the new real-world environment, such as a first real-world object 810 and a second real-world object 820. The real-world object selection module 516 can receive input from a user that selects a specific real-world object depicted in the images, such as the first real-world object 810. For example, the real-world object selection module 516 receives a gesture from the user that taps on a region of the image 801 displayed on the client device 102 corresponding to the specific real-world object (e.g., a real-world chair or first real-world object 810). In response to receiving the input, the real-world object selection module 516 obtains a real-world segmentation from the object detection module corresponding to the specific real-world object.

The real-world object selection module 516 retrieves the list of previously generated virtual experiences. The list can be overlaid on top of the specific real-world object. The real-world object selection module 516 receives a user input that selects the first virtual experience from the list. For example, as shown in FIG. 7, a user interface 700 is presented to the user at the new location (e.g., the location of the new real-world environment, such as a second location). The user interface 700 includes a list of different previously generated virtual experiences. The user interface 700 can present a message 710 informing the user to select a given previously generated virtual experience. The user interface 700 receives input from the user, selecting the first virtual experience 712, such as by tapping on the visual representation of the first virtual experience 712. In some cases, the user interface 700 can highlight or visually distinguish certain virtual experiences that the user interface 700 recommends activating. The user interface 700 can receive input, such as GPS coordinates, and can search a list of places associated with the GPS coordinates, to determine a type (e.g., furniture store, clothing store, kitchen hardware, and so forth) of the new real-world environment at the GPS coordinates. Based on the type, the user interface 700 can recommend certain virtual experiences that correspond to the type of the new real-world environment. For example, if the user is in a kitchen hardware store, the user interface 700 can recommend a virtual experience that was previously generated based on real-world objects of a kitchen. If the user is in a furniture store, the user interface 700 can recommend a virtual experience that was previously generated based on real-world objects of a living room.

In response to receiving input that selects the first virtual experience 712, the real-world object selection module 516 retrieves the first virtual experience and generates a 3D cube over a portion of the specific real-world object. For example, the user interface 800 (FIG. 8) includes a 3D cube 830, in which virtual objects 834, of the real-world environment of the first location, are presented in a transparent manner over the specific real-world object (e.g., the first real-world object 810). The 3D cube and depict one or more portions of the virtual objects included in the first virtual experience. Within the 3D cube (inside the cube), a progress indicator 832, such as a bouncing arrow, is displayed and animated while the first virtual experience is processed to render the contents of the first virtual experience within the context of the new real-world environment.

Figure 9:
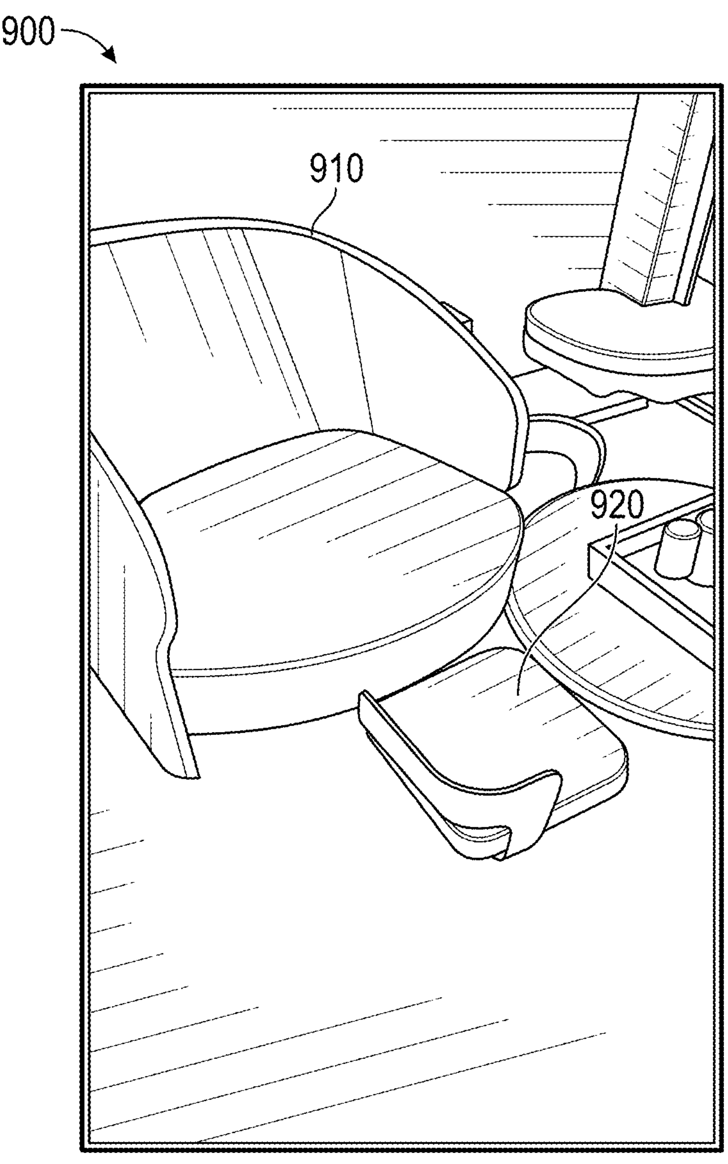

The real-world object selection module 516 communicates the specific real-world object segmentation, the processed first virtual experience, and the image depicting the new real-world environment to the image modification module 518. The image modification module 518 uses the segmentation of the specific real-world object to delete or remove pixels of the image depicting the new real-world environment at a new location that is outside of the segmentation of the specific real-world object. In this way, any real-world object that falls outside of the segmentation of the specific real-world object is removed from the image, depicting the new real-world environment. As a result, only the specific real-world object remains depicted in the image. Then, the image modification module 518, after completing processing the first virtual experience, overlays the virtual objects of the first virtual experience over the image from which the real-world objects (excluding the specific real-world object) have been removed. Namely, the image modification module 518 presents the first virtual experience over all of the portions of the image depicting the new real-world environment, except the specific real-world object. For example, as shown in FIG. 9, the user interface 900 presents the real-world object 910 (corresponding to the selected first real-world object 810 of the new real-world environment at a second location) within a view of the virtual experience that includes one or more virtual objects 920 corresponding to real-world objects of the previously captured real-world environment of the first location.

Referring to FIG. 5, the image modification module 518 communicates the modified image, in which the first virtual experience is overlaid onto the image, that includes only the specific real-world object to the image display module 520. The image display module 520 presents the modified image on the client device 102. The image display module 520 can detect that a camera, depicting the new real-world environment, has been moved to capture new images of the new real-world environment. While the camera is moved, the image display module 520 continues to receive images in which all real-world objects, except the specific real-world object, have been removed, and over which the first virtual experience is presented. In this way, a real-world object from a new real-world environment can be presented within a view of the first virtual experience. The image display module 520 can receive input that rotates the virtual experience. In response, the image display module 520 modifies a view of the first virtual experience while keeping a depiction of the specific real-world object in the same location. This allows the user to see how the specific real-world object looks in different areas of the first virtual experience.

In some examples, the first virtual experience includes a VR experience. In such cases, the real-world object selection module 516 uses the segmentation of the specific real-world object to generate a 3D model or virtual representation of the specific real-world object. The real-world object selection module 516 communicates this virtual representation of the specific real-world object to the image modification module 518. The image modification module 518 adds the virtual representation of the specific real-world object into the VR experience corresponding to the first location. The image modification module 518 can allow the user to move around in VR to see how the virtual representation of the specific real-world object looks within the first virtual experience corresponding to the first location.

The image modification module 518 can receive input that modifies one or more portions of the virtual experience. For example, the image modification module 518 can receive input that adds one or more virtual objects, changes positions of certain virtual objects, and/or removes certain virtual objects. The image modification module 518 updates the image depicting the specific real-world object based on the modifications to the virtual experience.

In some examples, the new real-world environment module 514 detects a second client device 102 within a threshold distance (e.g., less than 5 feet) of a first client device 102, corresponding to the user who generated the first virtual experience. In response, the new real-world environment module 514 can determine that a user of the second client device 102 is friends on a social network with the user of the first client device 102. In such cases, the new real-world environment module 514 presents an option for display on the second client device 102 for the user of the second client device 102 to join the first virtual experience. The user of the second client device 102 can be presented the same virtual experience as that which is presented to the user of the first client device 102. Specifically, all of the real-world objects, except the specific real-world object, can be removed from the images of the new real-world environment and the contents of the virtual experience is overlaid on the modified image, in which only the specific real-world object remains depicted. This modified image is presented in a synchronized manner to both the first and second client device 102. Input can be received from the first or second client devices 102 to perform modifications to the displayed images, such as to remove, reposition, and/or add virtual objects to the images, such as drawings on real-world or virtual walls depicted in the images.

Figure 10:
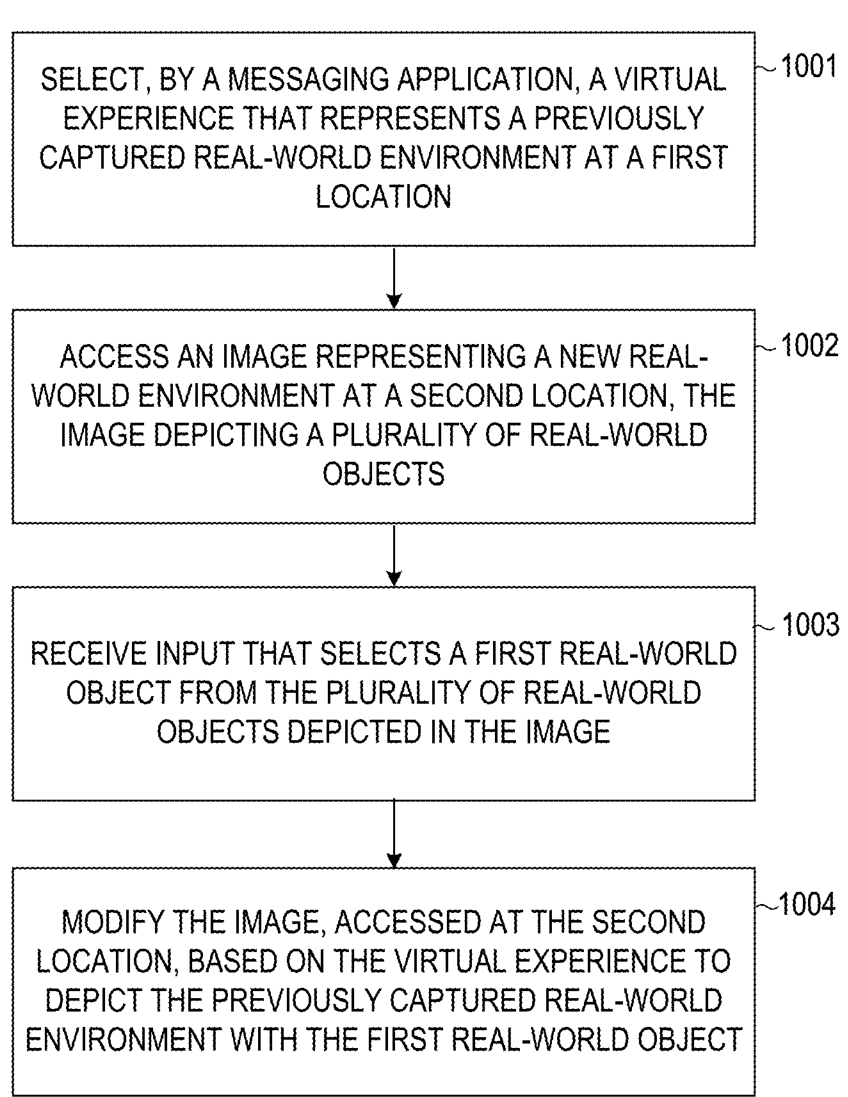
FIG. 10 is a flowchart illustrating example operations of the pre-generated virtual experience system, according to some examples.

FIG. 10 is a flowchart of a process 1000, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 of FIG. 1 selects, by a messaging application, a virtual experience that represents a previously captured real-world environment at a first location, as discussed above.

At operation 1002, the client device 102 accesses an image representing a new real-world environment at a second location, the image depicting a plurality of real-world objects, as discussed above.

At operation 1003, the client device 102 receives input that selects a first real-world object from the plurality of real-world objects depicted in the image, as discussed above.

At operation 1004, the client device 102 modifies the image, accessed at the second location, based on the virtual experience to depict the previously captured real-world environment with the first real-world object, as discussed above.

Machine Architecture

Figure 11:
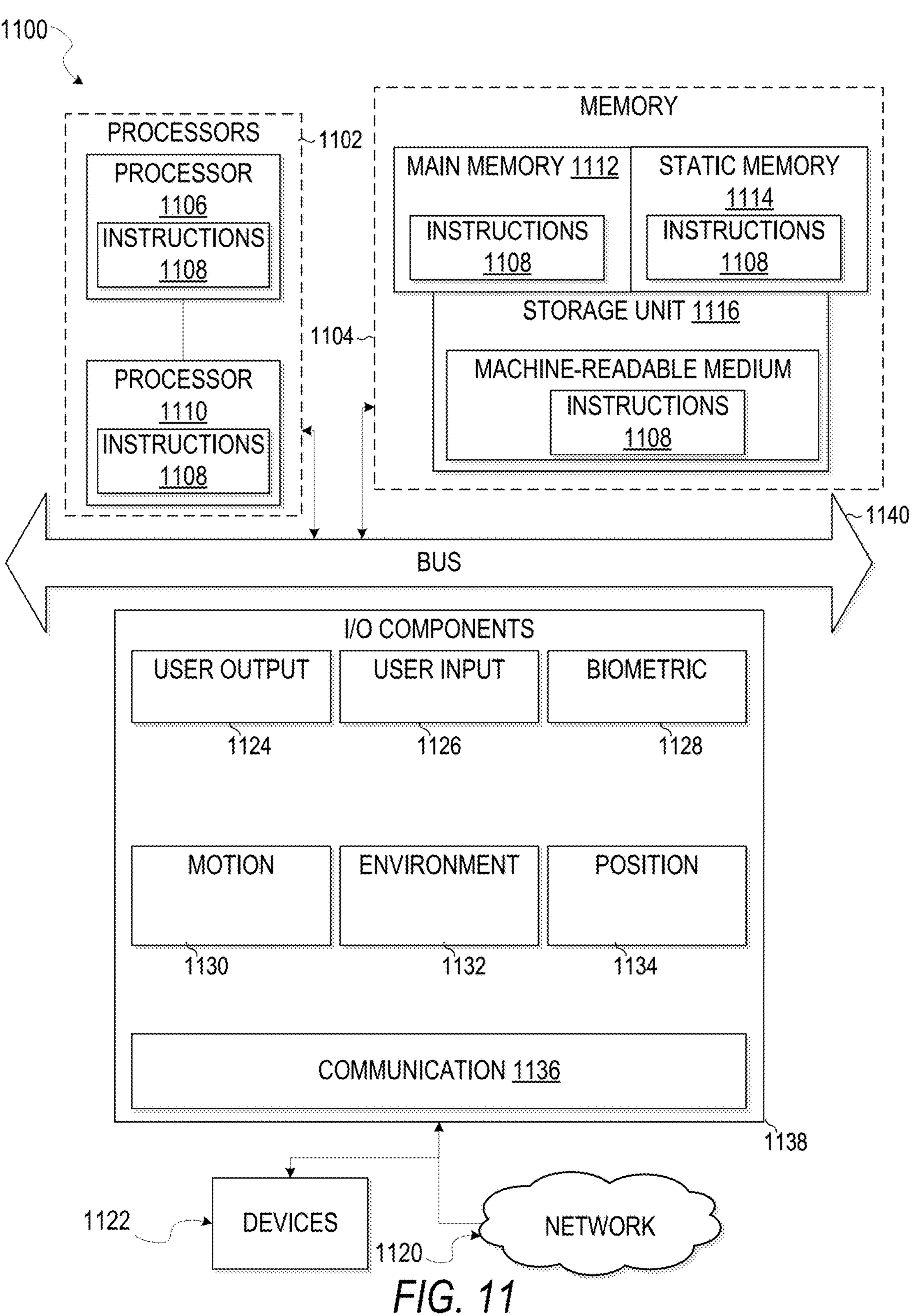
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100, which is programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm, being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within a machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines, such as mobile phones, may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, and rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising of, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., HTTP). Similarly, the instructions 1108 may be transmitted or received using a transmission medium via a coupling (e.g., a peer-to-peer coupling) to the devices 1122.

Software Architecture

Figure 12:
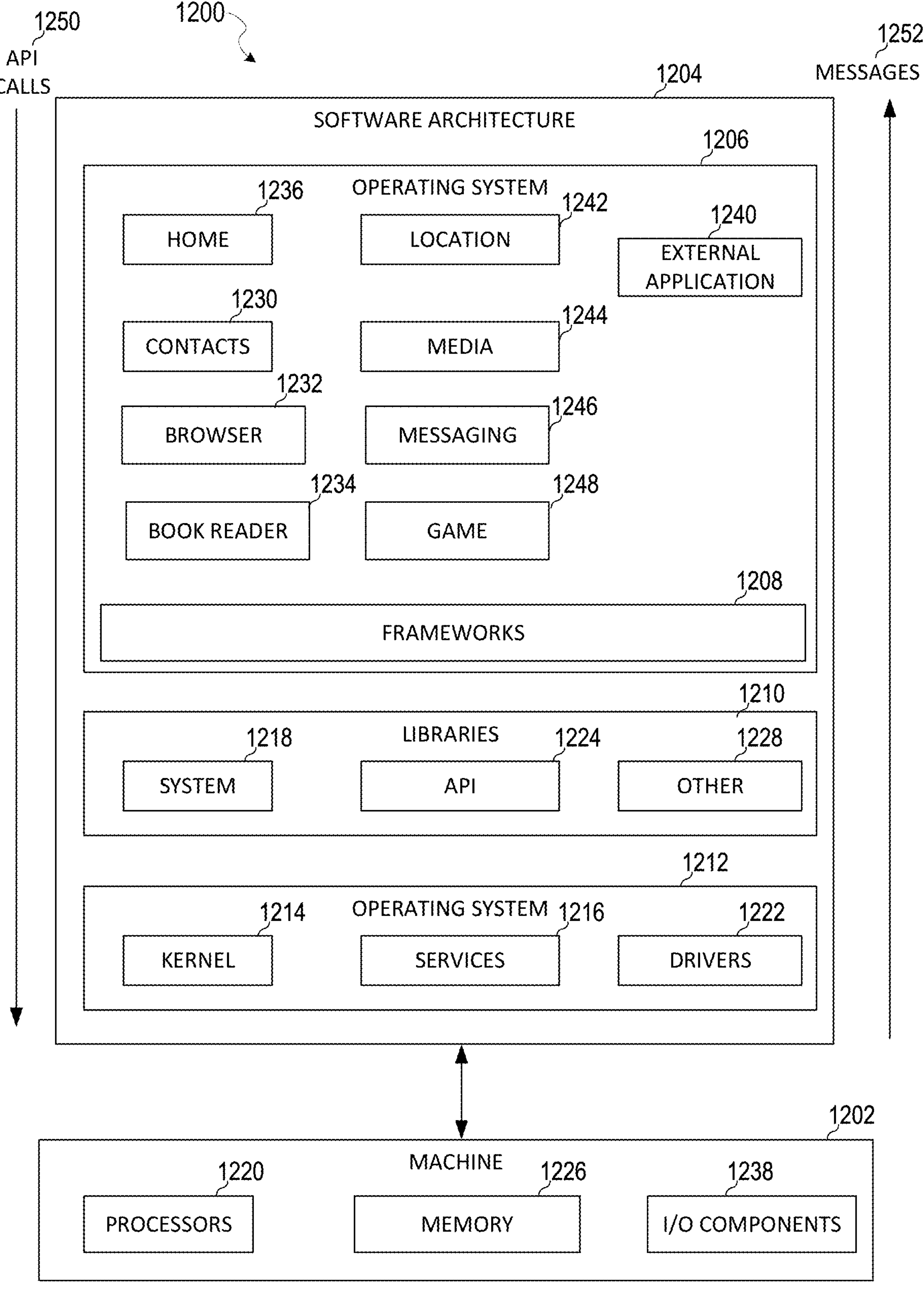
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware, such as a machine 1202, that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and operating system 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224, such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ SDK by an entity other than the vendor of the particular platform) may be mobile software running on a mobile operating system, such as IOS™, ANDROID™, WINDOWS® Phone, or another mobile operating system. In this example, the external application 1240 can invoke the API calls 1250, provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components, and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor, configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

selecting, by an application, a virtual experience that represents a previously captured real-world environment at a first location;

accessing an image representing a new real-world environment at a second location, the image depicting a plurality of real-world objects;

identifying a subset of the plurality of real-world objects depicted in the image that excludes a selected first real-world object; and overlaying the virtual experience on top of the subset of the plurality of real-world objects that excludes the selected first real-world object.

2. The method of claim 1, comprising:

receiving input that selects the first real-world object from the plurality of real-world objects depicted in the image; and modifying the image, accessed at the second location, based on the virtual experience, to depict the previously captured real-world environment with the first real-world object.

3. The method of claim 1, further comprising:

removing the subset of the real-world objects from the image to keep only the first real-world object in the image.

4. The method of claim 1, further comprising:

capturing the image as part of a real-time feed received from a camera of a device;

detecting movement of the camera of the device; and adjusting a relative position of the first real-world object within a view of the previously captured real-world environment as the movement of the camera is detected.

5. The method of claim 4, wherein adjusting the relative position comprises rotating the view of the previously captured real-world environment while the first real-world object remains stationary.

6. The method of claim 1, further comprising:

capturing one or more images at the first location using a camera of a device;

generating a three-dimensional (3D) model of the real-world environment at the first location using the one or more images; and generating the virtual experience based on the 3D model of the real-world environment at the first location.

7. The method of claim 6, further comprising:

receiving data collected by at least one of a lidar sensor or Neural radiance fields (NeRF) to generate the 3D model.

8. The method of claim 6, further comprising applying a neural network to generate the 3D model.

9. The method of claim 6, wherein the virtual experience comprises a first virtual experience, further comprising:

capturing one or more images at a third location using the camera of the device;

generating a 3D model of a real-world environment at the third location using the one or more images captured at the third location; and generating a second virtual experience based on the 3D model of the real-world environment at the third location.

10. The method of claim 9, further comprising:

storing a list of previously captured real-world environments comprising the first and second virtual experiences; and displaying, by the application, the list of previously captured real-world environments comprising the first and second virtual experiences.

11. The method of claim 10, wherein selecting, by the application, the virtual experience comprises receiving input that selects the first virtual experience from the displayed list of previously captured real-world environments.

12. The method of claim 1, further comprising:

modifying one or more virtual items included as part of the virtual experience.

13. The method of claim 12, wherein modifying the one or more virtual items comprises at least one of moving, removing, or adding the virtual items in the virtual experience.

14. The method of claim 1, wherein the virtual experience comprises a virtual reality (VR) experience, further comprising:

generating a virtual representation of the first real-world object; and adding the virtual representation of the first real-world object to the VR experience.

15. The method of claim 1, further comprising training a neural network to segment real-world items by performing operations comprising:

receiving training data comprising a plurality of training images and ground truth real-world item segmentations for each of the plurality of training images, each of the plurality of training images depicting a different type of real-world environment;

applying the neural network to a first training image of the plurality of training images to estimate segmentations of items depicted in the first training image;

computing a deviation between the estimated segmentations and the ground truth real-world item segmentations associated with the first training image; and updating parameters of the neural network based on the computed deviation.

16. The method of claim 1, further comprising:

detecting a second user within a threshold proximity to a first user, the second user being a friend of the first user on the application; and providing an option to a second device of the second user to join the first user in the virtual experience.

17. The method of claim 16, further comprising:

receiving input from the second device that modifies one or more virtual elements; and applying one or more further modifications to the image based on the input received from the second device.

18. The method of claim 17, wherein the input comprises virtually drawing on walls depicted in the image.

19. A system comprising:

at least one processor configured to perform operations comprising:

selecting, by an application, a virtual experience that represents a previously captured real-world environment at a first location;

accessing an image representing a new real-world environment at a second location, the image depicting a plurality of real-world objects;

identifying a subset of the plurality of real-world objects depicted in the image that excludes a selected first real-world object; and overlaying the virtual experience on top of the subset of the plurality of real-world objects that excludes the selected first real-world object.

20. A non-transitory machine-readable storage medium that includes instructions that, when executed by one or more processors of a machine, cause the machine to perform operations comprising:

selecting, by an application, a virtual experience that represents a previously captured real-world environment at a first location;

accessing an image representing a new real-world environment at a second location, the image depicting a plurality of real-world objects;

identifying a subset of the plurality of real-world objects depicted in the image that excludes a selected first real-world object; and overlaying the virtual experience on top of the subset of the plurality of real-world objects that excludes the selected first real-world object.

* * * * *